United States Patent
Gregerson

(10) Patent No.: US 12,462,469 B2
(45) Date of Patent: Nov. 4, 2025

(54) WIRE-BASED CALIBRATION APPARATUS FOR X-RAY IMAGING SYSTEMS

(71) Applicant: See All AI Inc., Nashua, NH (US)

(72) Inventor: Eugene Alma Gregerson, North Salt Lake, UT (US)

(73) Assignee: See All AI Inc., Nashua, NH (US)

( * ) Notice: Subject to any disclaimer, the term of this patent is extended or adjusted under 35 U.S.C. 154(b) by 0 days.

(21) Appl. No.: 18/974,359

(22) Filed: Dec. 9, 2024

(65) Prior Publication Data
US 2025/0186014 A1    Jun. 12, 2025

Related U.S. Application Data

(60) Provisional application No. 63/607,956, filed on Dec. 8, 2023, provisional application No. 63/608,122, filed on Dec. 8, 2023.

(51) Int. Cl.
*A61B 6/58*    (2024.01)
*A61B 90/00*   (2016.01)

(52) U.S. Cl.
CPC ...... *A61B 6/582* (2013.01); *A61B 2090/3966* (2016.02)

(58) Field of Classification Search
CPC .... A61B 2090/3983; A61B 2090/3966; A61B 2090/3937; A61B 2090/3995
See application file for complete search history.

(56) References Cited

U.S. PATENT DOCUMENTS

| | | | |
|---|---|---|---|
| 8,232,798 B2* | 7/2012 | Krueger | A61B 5/06 324/228 |
| 10,258,414 B2* | 4/2019 | O'Grady | A61B 34/30 |
| 10,390,843 B1* | 8/2019 | Henderson | A61B 6/587 |
| 10,709,394 B2 | 7/2020 | Zhou et al. | |
| 10,839,543 B2 | 11/2020 | Cheng et al. | |
| 11,207,135 B2 | 12/2021 | Schmidt et al. | |
| 11,379,985 B2 | 7/2022 | Wang et al. | |
| 2003/0130576 A1* | 7/2003 | Seeley | A61B 90/36 600/426 |

(Continued)

FOREIGN PATENT DOCUMENTS

WO    2023/186996 A1    10/2023

OTHER PUBLICATIONS

Invitation to Pay Additional Fees received for PCT Patent Application No. PCT/US2024/059213, mailed on Jan. 2, 2025, 2 pages.

(Continued)

*Primary Examiner* — David J Makiya
*Assistant Examiner* — Soorena Kefayati
(74) *Attorney, Agent, or Firm* — ArentFox Schiff LLP; Bruce D. Jobse

(57) ABSTRACT

A calibration target for use with a radiographic image detector includes a target body securable to the image detector and a plurality of radiopaque linear markers, e.g. wires, fixed to the target body, wherein access to the image detector by incident radiation is at least partially blocked by the plurality of linear markers. By using the geometric properties of wires and advanced detection techniques, a precise calibration suitable for high-quality, volumetric three-dimensional CT reconstruction from biplanar X-ray images is achieved.

25 Claims, 19 Drawing Sheets

(56) References Cited

U.S. PATENT DOCUMENTS

| | | | |
|---|---|---|---|
| 2004/0015077 A1* | 1/2004 | Sati | A61B 6/08 600/427 |
| 2005/0117708 A1* | 6/2005 | Cho | A61B 6/027 378/164 |
| 2005/0159759 A1 | 7/2005 | Harbaugh et al. | |
| 2008/0285843 A1 | 11/2008 | Lim | |
| 2009/0207971 A1* | 8/2009 | Uhde | A61B 6/547 378/41 |
| 2009/0285366 A1* | 11/2009 | Essenreiter | A61B 6/4441 378/207 |
| 2010/0249800 A1* | 9/2010 | Kim | A61B 6/4441 606/130 |
| 2010/0312103 A1* | 12/2010 | Gorek | A61B 17/1703 600/425 |
| 2011/0255661 A1* | 10/2011 | Schweizer | A61B 6/545 378/42 |
| 2012/0236993 A1* | 9/2012 | Graumann | A61B 6/5235 378/63 |
| 2013/0170627 A1* | 7/2013 | Topfer | A61B 6/4233 378/207 |
| 2016/0242724 A1* | 8/2016 | Lavallee | A61B 90/39 |
| 2017/0156800 A1* | 6/2017 | Brown | A61B 6/4441 |
| 2018/0315221 A1 | 11/2018 | Jones et al. | |
| 2018/0315243 A1 | 11/2018 | Mahler et al. | |
| 2019/0216409 A1 | 7/2019 | Zhou et al. | |
| 2020/0222018 A1 | 7/2020 | Van Walsum et al. | |
| 2021/0113176 A1* | 4/2021 | Sehnert | A61B 6/08 |
| 2021/0169504 A1* | 6/2021 | Brown | A61B 6/487 |
| 2021/0192810 A1 | 6/2021 | Paysan et al. | |
| 2022/0020215 A1 | 1/2022 | Banerjee et al. | |
| 2022/0031423 A1* | 2/2022 | Halpert | B43K 29/08 |
| 2024/0185509 A1 | 6/2024 | Kovler et al. | |

OTHER PUBLICATIONS

Invitation to Pay Additional Fees received for PCT Patent Application No. PCT/US2024/059215, mailed on Jan. 30, 2025, 2 pages.
Invitation to Pay Additional Fees received for PCT Patent Application No. PCT/US2024/059236, mailed on Jan. 29, 2025, 2 pages.

* cited by examiner

WIRE-BASED CALIBRATION APPARATUS FOR X-RAY IMAGING SYSTEMS

CROSS REFERENCE TO RELATED APPLICATIONS

This application claims the benefit of priority to the following applications, filed by the same Applicant, See All Surgical Inc., the entire contents of all of which are incorporated herein by this reference for all purposes:

U.S. Provisional Application No. 63/608,122 filed on Dec. 8, 2023; and,

U.S. Provisional Application No. 63/607,956, filed Dec. 8, 2023, 2023.

Further, the entire contents of the following applications, filed by the same Applicant on an even date herewith, are incorporated herein by this reference for all purposes:

U.S. patent application Ser. No. 18/974,399, entitled "System And Method For Generation of Registration Transform for Surgical Navigation"; and U.S. patent application Ser. No. 18/974,545, entitled "System and Method for Reconstruction of 3D Volumes from Biplanar X-ray Images".

FIELD OF THE INVENTION

The disclosed system and technique relate to radiographic imaging systems, and, more particularly to a calibration target for use with mobile radiographic imaging equipment that utilizes wire-based calibration targets.

BACKGROUND OF THE INVENTION

Traditional static radiographic images, including X-rays and computer tomography, have been used in medical imaging and diagnostics, however, these technologies are not well suited for procedures requiring real time imaging of patient anatomy and/or surgical navigation assistance. Instead, fluoroscopy, comprising pulsed radiographic energy, is utilized for multiple procedures in which real time visual assistance is required during the procedure. However, fluoroscopic images provide only two dimensional views of the patient anatomy and are not suitable for complicated procedures, especially surgical procedures which require three-dimensional image of the patient anatomy and real time displays of instruments relative to the patient's anatomy. Unfortunately, real time generation of a patient's anatomy via computerized tomography is very expensive and not financially practical for many medical facilities. More recently, attempts have been made to generate or reconstruct three dimensional volume of CT quality images from a limited number of X-rays, as disclosed in U.S. Pat. No. 10,709,394, however, the disclosed system and method is not useful for real time surgical navigation assistance and the resulting volume from lack of accuracy due to the averaging of values to create the reconstructed CT images. Accordingly, a need exists for a way to provide three dimensional CT quality images in real-time to assist with surgical navigation.

Computer assisted surgical systems utilize predominantly visual position data to assist surgeons, without the benefit of radiographic images, such as that disclosed in US Patent Application Publication US20050159759A1, however, such systems are typically limited to used identifying proper incision location and surgical navigation guidance relative to only exposed patient anatomy. Accordingly, a further need exists for a way to provide real-time three dimensional CT quality images of unexposed patient anatomy to assist with surgical navigation.

Attempts have been made to utilize both radiographic images and visually acquired positional data to assist with surgical navigation, such as that disclosed in US Patent Application Publication US20210169504A1, however, such system is not capable of creating a three dimensional volume of CT quality images useful for real time surgical navigation purposes. The difficulty in attempting to utilize visually acquired position information and radiographic images is the calibration of the camera's coordinate system with that of the X-ray imaging system. This problem is further compounded when trying to align the position of a surgical instrument as defined within the coordinate system of the patient or camera within the coordinate system of a three dimensional volume of radiographic images, such as CT images. Accordingly, a need exists for a system and method which is capable of accurately creating a 3D volume of the patient anatomy in an efficient, near real-time manner from relatively few radio graphic images and which is further capable of aligning the detected position of a surgical instrument in the patient coordinate space with the created three dimensional volume of CT quality images of the patients anatomy, to facilitate accurate navigational guidance of instruments relative to both exposed and non-exposed patient anatomy.

In medical imaging, precise calibration of radiographic imaging systems is essential for accurate reconstruction of three-dimensional (3D) volumes from two-dimensional (2D) projections. Mobile C-arm systems are widely used in interventional radiology and surgical navigation due to their flexibility and mobility. However, accurate calibration of these systems remains a significant challenge, particularly when aiming for high-precision 3D reconstructions using a limited number of radiographic images.

Traditional calibration methods for C-arm systems often employ calibration targets consisting of small spherical radiopaque markers (e.g., ball bearings or BBs) of various sizes and depths embedded within a calibration object. While these markers are effective for detecting precise 2D positions in radiographic images, however, they introduce challenges when the images are used for back projection in 3D volume reconstruction. The spherical markers occupy multiple pixels in the image, complicating digital subtraction and potentially degrading the quality of the reconstructed volume. Moreover, the presence of these markers can introduce artifacts and interfere with the imaging of anatomical structures. In addition, spherical marker targets are difficult to manufacture accurately and require embedding markers within machined rigid foam and precise measurement of each marker's 3D location using specialized equipment like coordinate measuring machines (CMMs). This process is time-consuming, expensive, and results in heavy, bulky targets.

Accordingly a need exists for a method and system that improves the calibration process for radiographic imaging systems used in reconstructing 3D CT volumes from biplanar radiographic images.

A further need exists for a method and system that simplifies the detection and localization of calibration features in 2D radiographic images.

A still further need exists for a method and system that facilitates easy digital subtraction of calibration features from the images post-calibration.

An even further need exists for a method and system that enhances the accuracy of camera calibration by providing precise 2D to 3D point correspondences.

An even further need exists for a method and system that captures and corrects image distortions inherent in radiographic imaging systems, especially image intensifier systems.

An even further need exists for a method and system that mitigates aliasing effects and improves robustness to partial occlusions or noise.

An even further need exists for a method and system that simplifies manufacturing and improves robustness of the calibration target.

SUMMARY OF THE INVENTION

Disclosed is a system and methods for combining optical and radiographic data to enhance imaging capabilities. Specifically, the disclosed system and method combine both visually obtained patient pose position information and radiographic image information to facilitate calibrated surgical navigation. The process involves a data acquisition phase, a system calibration phase, a volume reconstruction phase, and a surgical navigation phase, facilitating the alignment of instrument coordinates with the patient and reconstructed volume coordinates thereby enabling tracking and navigation of surgical instruments within a reconstructed 3D volume of a patient anatomy, even if the such anatomy is not exposed during a procedure.

According to one aspect, disclosed is an advanced calibration method for radiographic imaging systems that utilizes wire-based calibration targets. The disclosed method addresses significant limitations in existing C-arm calibration techniques, particularly when reconstructing three-dimensional (3D) computed tomography (CT) volumes from biplanar X-ray images. Traditional calibration targets are small spherical radiopaque markers, which occupy multiple pixels in a digital X-ray image and complicate digital subtraction during back-projection. The disclosed method employs a calibration target comprising thin wires arranged at different depths, with diameters optimized for visibility in X-ray images yet minimal enough to be digitally subtracted post-calibration.

The system accurately detects the wires and assign unique labels to each wire in the 2D images. Polynomials are fitted to the labeled pixels of each wire, allowing precise computation of crossover points and equally spaced points along the wire projections. These points form robust correspondences between 2D image points and known 3D coordinates in the calibration target, enabling accurate camera calibration.

An additional advantage of using wires generally parallel to the detector is the ability to model and correct image distortions inherent in X-ray imaging systems, especially those in X-ray imaging systems using image intensifiers. The continuous nature of the wires, extending across the X-ray image, allows fitted polynomials to accurately capture distortions such as pincushion and S-curve distortions, enhancing calibration accuracy.

Furthermore, the disclosed wire-based calibration target offers significant manufacturing advantages over traditional spherical marker-based targets, as the calibration target is easy to manufacture from simple, accurately machined rigid metallic parts with strung wires. The design ensures repeatability without individual measurements for each target, resulting in a robust, lightweight, and easily attachable calibration target. The disclosed system and method also addresses partial occlusions or degraded visibility of wires by using deep learning models to detect and reconstruct missing wire features. This enhances the robustness of the calibration process in practical clinical scenarios.

According to one aspect of the disclosure, a calibration target apparatus for use with a radiation image detector comprises: a target frame securable to a radiographic image detector, the target frame defining an interior passage; and a plurality of at least partially radiopaque markers coupled to the target frame and transversing the interior passage, wherein the plurality of radiopaque markers partially obstruct passage of radiation through the internal passage of the frame. In embodiments, the plurality of radiopaque markers are linear in shape. In embodiments, the plurality of radiopaque markers comprise wires. In embodiments, the interior passage has a generally circular shape. In embodiments, the plurality of radiopaque markers have known spatial coordinates relative to the target frame. In embodiments, the target frame comprises a pair of frames secured together by posts. In embodiments, the target frame further comprises a pair of brackets for securing the target frame to the radiographic image detector. In embodiments, a first of the plurality of radiopaque markers are attached to the target frame at a first depth of the interior passage and a second of the plurality of radiopaque markers are attached to the target frame at a second depth of the interior passage. In embodiments, the calibration target apparatus further comprises a side wall encompassing the target frame. In embodiments, the calibration target apparatus further comprises a reference marker having a unique shape disposed on the sidewall. In embodiments, the calibration target apparatus further comprises a plurality of reference markers, each having a unique shape, disposed on the sidewall. In embodiments, the respective shapes of the plurality of reference markers collectively comprise an asymmetric pattern.

According to yet another aspect of the disclosure, a calibration target apparatus for use with a radiographic image detector of an imaging system comprises: a target body securable to the radiographic image detector; and a plurality of radiopaque linear markers fixed to the target body, wherein access to the radiographic image detector by incident radiation is at least partially blocked by the plurality of linear markers. In embodiments, the plurality of linear markers have known spatial coordinates relative to the target body. In embodiments, the plurality of radiopaque markers comprise wires. In embodiments, the target body is defined by a side wall. In embodiments, a reference marker disposed on the sidewall. In embodiments, a plurality of reference markers disposed on the sidewall. In embodiments, the plurality of reference markers collectively comprise an asymmetric pattern. In embodiments, the target body has a size and shape to enable frictional attachment over the radiographic image detector. In embodiments, the target body has a substantially circular or rectangular exterior perimeter. In embodiments, the target body has an end surface comprising a material that is substantially transparent to radiation incident thereon.

According to still yet another aspect of the disclosure, a calibration target apparatus for use with a radiographic image detector of an imaging system, comprises: a target body securable to the radiographic image detector; and a plurality of radiopaque non-spherical markers fixed to the target body, wherein access to the radiographic image detector by incident radiation is at least partially blocked by the plurality of non-spherical markers. In embodiments, the plurality of non-spherical markers have known spatial coordinates relative to the target body. In embodiments, the plurality of non-spherical markers comprise wires.

According to yet another aspect of the disclosure, a method of calibration of spatial reference volumes comprises: A) detecting a position of a first reference marker proximate a subject, the position of the first reference marker defining six degrees of freedom and rotation and translation data relative to a pose of the first reference marker; B) detecting, a position of a second reference marker proximate a calibration target on an image detector, the calibration target containing calibration markers with predetermined spatial coordinates relative to the image detector and being visible in biplanar images detected by the image detector, the positions of the second reference marker defining six degrees of freedom and rotation and translation data relative to a pose the second reference marker; C) determining a position of the calibration markers in at least two biplanar images detected by the image detector; D) calibrating intrinsic and extrinsic parameters of the image detector, the parameters providing poses of independent image projections of each of the at least two biplanar images, and E) generating a registration transform from the two independent image projections, the registration transform defining a center and orientation of a voxel grid usable for back projection and reconstruction of a 3D volume; and F) reconstructing a 3D volume from the registration transform by back projection of the voxel grid.

According to still yet another aspect of the disclosure, a method for calibration of a radiographic image detector comprises: A) acquiring a biplanar radiographic image of a subject with linear obstructions present within the biplanar image; B) detecting the linear obstructions within the biplanar image; C) generating a labeled masks where each linear obstructions is assigned a unique label; D) assigning a polynomial equation to each linear obstructions, the polynomial equation encompassing the pixel within the linear obstructions; E) computing crossover points of the polynomial equations in a different plane; generation of equally spaced points along the fitted polynomials; and F) removing the linear obstructions from the biplanar image.

According to still yet another aspect of the disclosure, a method for calibration of a radiographic image detector comprises: A) acquiring a biplanar radiographic image of a subject with linear obstructions present within the biplanar image; B) detecting positions of the linear obstructions within the biplanar image with a pretrained deep learning model; C) generating, with the deep learning model, a labeled masks where each linear obstructions is assigned a unique label; D) fitting a polynomial equation to each linear obstructions, the polynomial equation identifying pixels within the a respective linear obstructions; E) computing crossover points of the polynomial equations; F) generation of equally spaced points along the linear obstructions; and G) removing the linear obstructions from the biplanar image.

According to still another aspect of the disclosure, a method for calibration of a radiographic image detector comprises: A) acquiring a biplanar radiographic image of a subject with linear obstructions present within the biplanar image; B) segmenting the linear obstructions from the background; C) assigning unique labels to each linear obstructions; and D) removing the linear obstructions from the biplanar image.

BRIEF DESCRIPTION OF THE DRAWINGS

The accompanying drawings, which are incorporated in and constitute a part of the specification, illustrate various example methods, and other example implementations of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. Furthermore, elements may not be drawn to scale.

DETAILED DESCRIPTION

As used herein the term "radiographic" or "radiography" or variations thereof are intended to include both traditional X-ray technology and images and as well as fluoroscopy or fluoroscopic technology and images.

Disclosed is a system and methods for combining optical and radiographic data to enhance imaging capabilities. Specifically, the disclosed system and method combine both visually obtained patient pose position information and radiographic image information to facilitate calibrated surgical navigation. The process involves a data acquisition phase, a system calibration phase, a volume reconstruction phase, and a surgical navigation phase, all resulting in the alignment of instrument coordinates with the patient and reconstructed volume coordinates enabling tracking and navigation of surgical instruments within a reconstructed 3D volume of a patient anatomy, even if the such anatomy is not exposed during a procedure.

Figure 1:
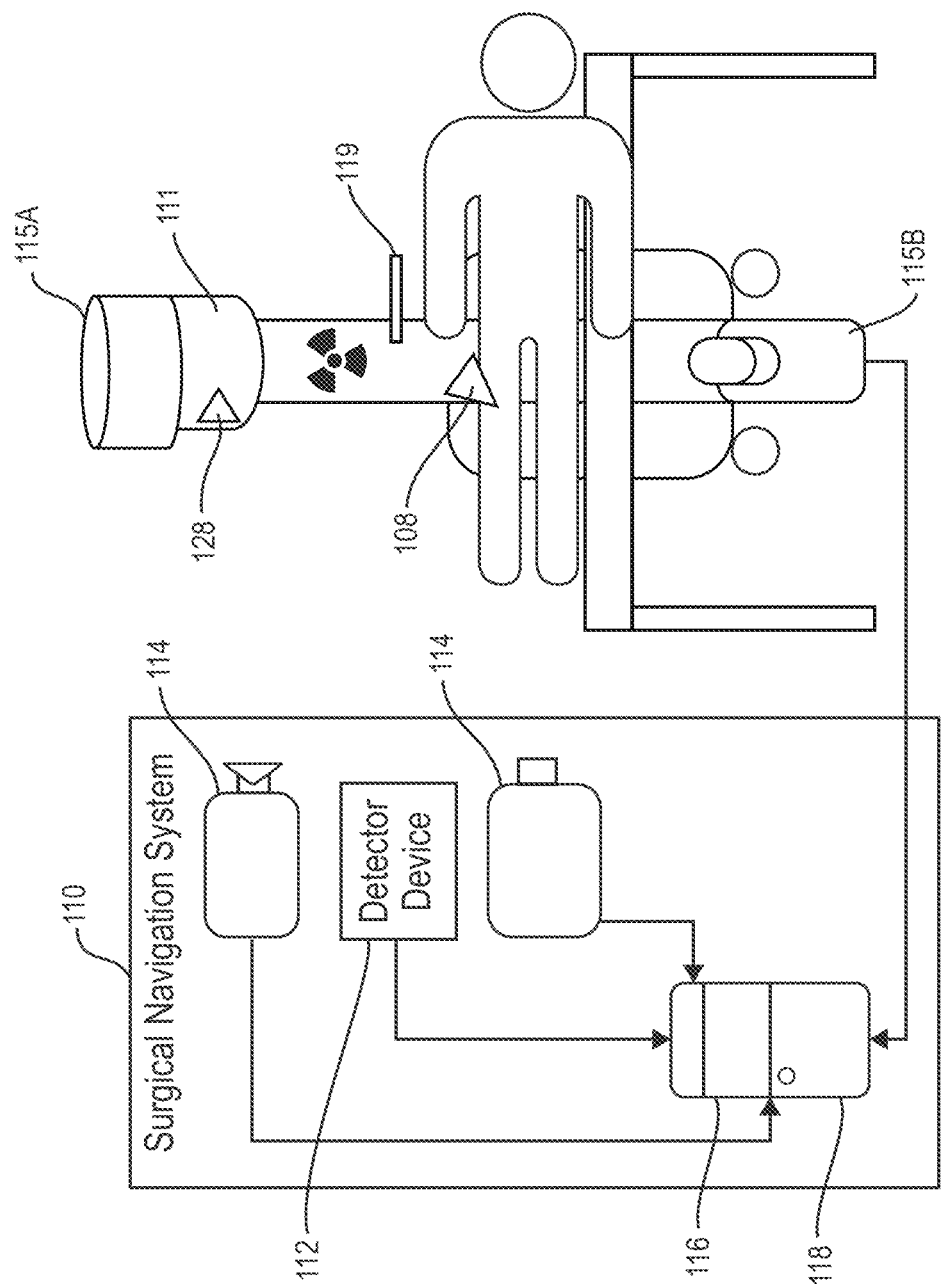
FIG. 1 is a conceptual illustration of a surgical navigation system in accordance with the disclosure.

FIG. 1 illustrates conceptually a surgical navigation system 110 suitable for use with the reference markers and anchors described herein. The surgical navigation system 110 may be used with a traditional fluoroscopy machine, e.g. a C-arm, having a source of radiation 115B disposed beneath the patient and a radiographic image detector 115A disposed on the opposite side of the patient.

In embodiments, surgical navigation system 110 comprises reference markers 108 or 128, a radiation detector 112, a calibration target 111, cameras 114, computer 116, and a display interface 118 used with an radiation source 115B and radiographic image detector 115A, device 115A. In embodiments, the components of surgical navigation system 110 may be contained within a single housing which is easily positionable along three axes within the surgical procedure space. Alternatively, one or more the components of surgical navigation system 110 may be located remotely from other components but interoperable therewith through suitable network infrastructure. The surgical system 110, and particularly cameras 114, track the reference marker 108 or 128 within the camera coordinate system, e.g. the patient coordinate system, and forward the positional information of the reference markers onto computer 116 for further processing.

One or more external optical camera 114 may be positioned to capture the operating area, as illustrated, and detect optical reference marker 8 attached to the patient and the reference marker 128 attached to the calibration target 111. External optical camera 14 provides real-time tracking of the 6-DoF poses (rotation and translation) of the markers 108 and 128. In embodiments, camera 114 may be implemented using one or more visible light cameras to capture real-time images of the surgical field including the patient and X-ray imaging system, e.g. a fluoroscope. A camera suitable for use as camera 114 is the Polaris product line of optical navigation products, commercially available from Northern Digital, Waterloo, Ontario, Canada. External camera 114 may be in communication with one or both of synchronizing device 112 and a processing unit 116. When the imaging systems X-ray is triggered, synchronizing device 112 identifies X-ray emissions relative to a predefined threshold level and signals computer 116 and/or external camera 114 and to capture pose information of the patient and imaging system itself via reference markers 108 and 128, respectively.

Reference markers 108 and 128 are fiducial markers that are easily detectable by the optical camera 114 and are attached to the patient and the calibration target 111, respectively, and serve as points of reference for coordinate transformations. The implementation of reference markers 108 and 128 is set forth in greater detail in co-pending U.S. patent application Ser. No. 18/974,434, entitled "Omni-View Unique Tracking Marker".

Figure 5:
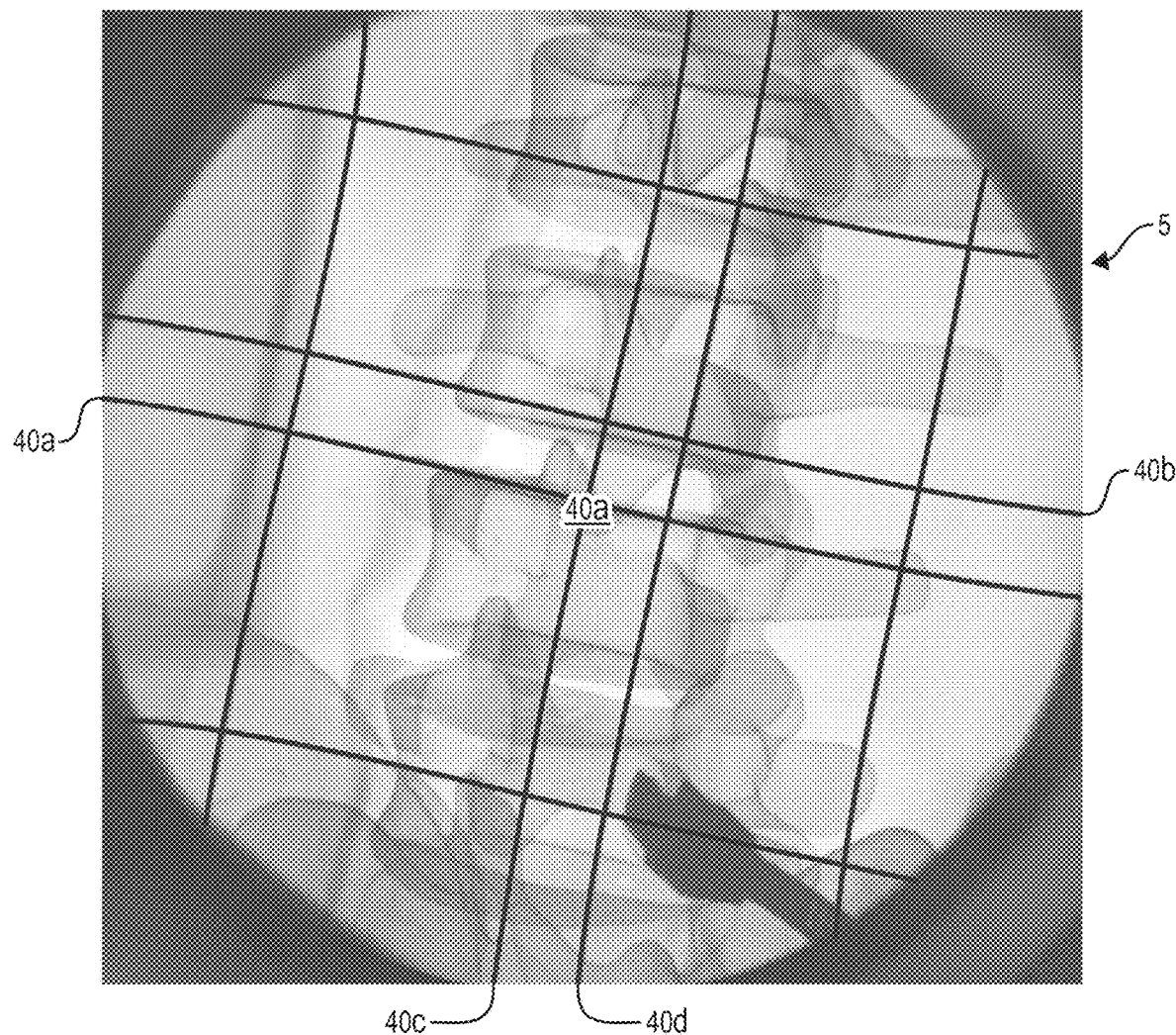
FIG. 5 is a typical "AP" X-ray image generated by a X-ray C-arm in the position of FIG. 5 when used in conjunction with a calibration target having linear markers transversing the radiographic image in accordance with the disclosure.
Figure 6:
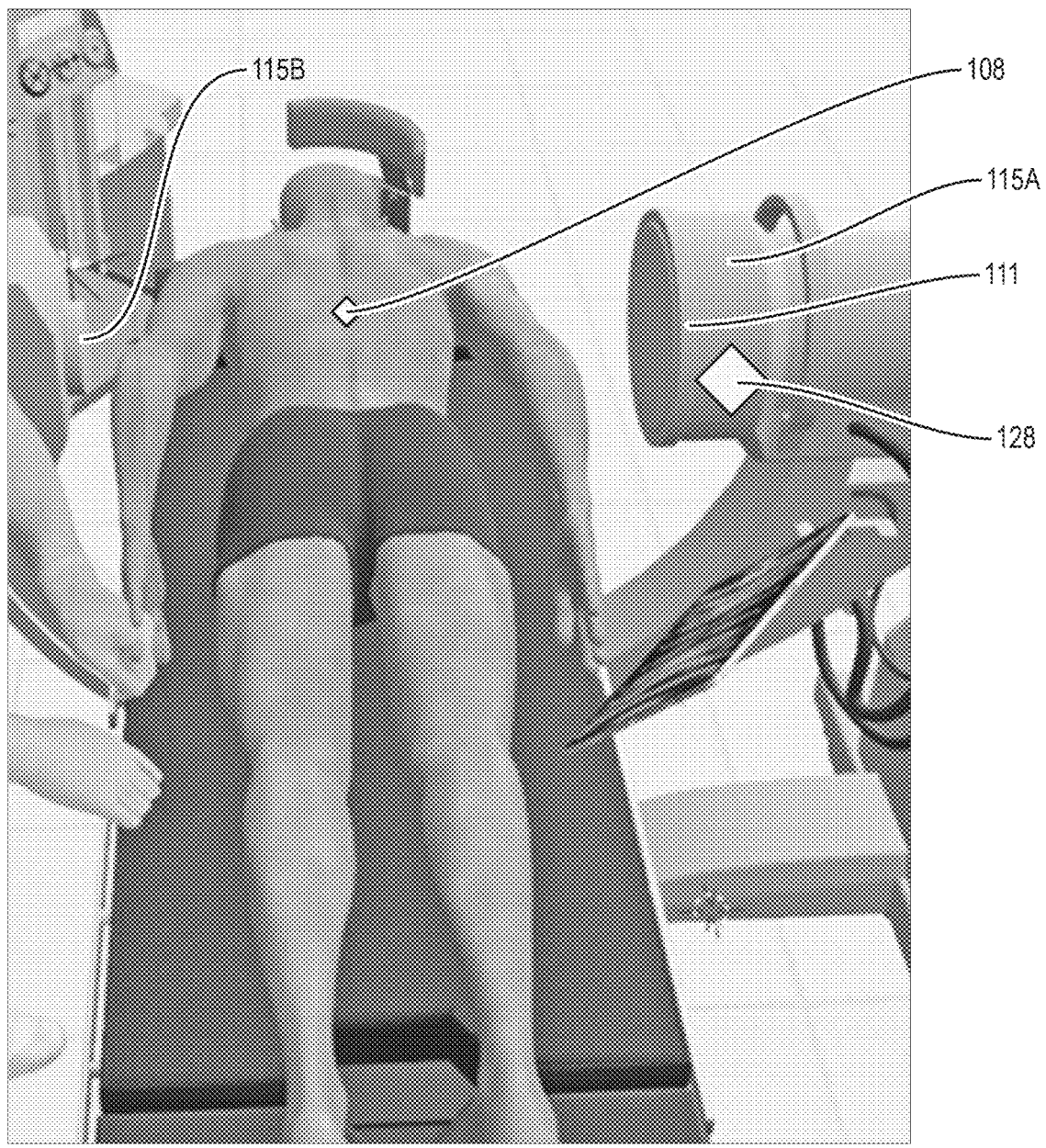
FIG. 6 is a conceptual illustration of the operating environment in which the X-ray C-arm is posed in a "Lateral" position in accordance with an illustrative embodiment.
Figure 7:
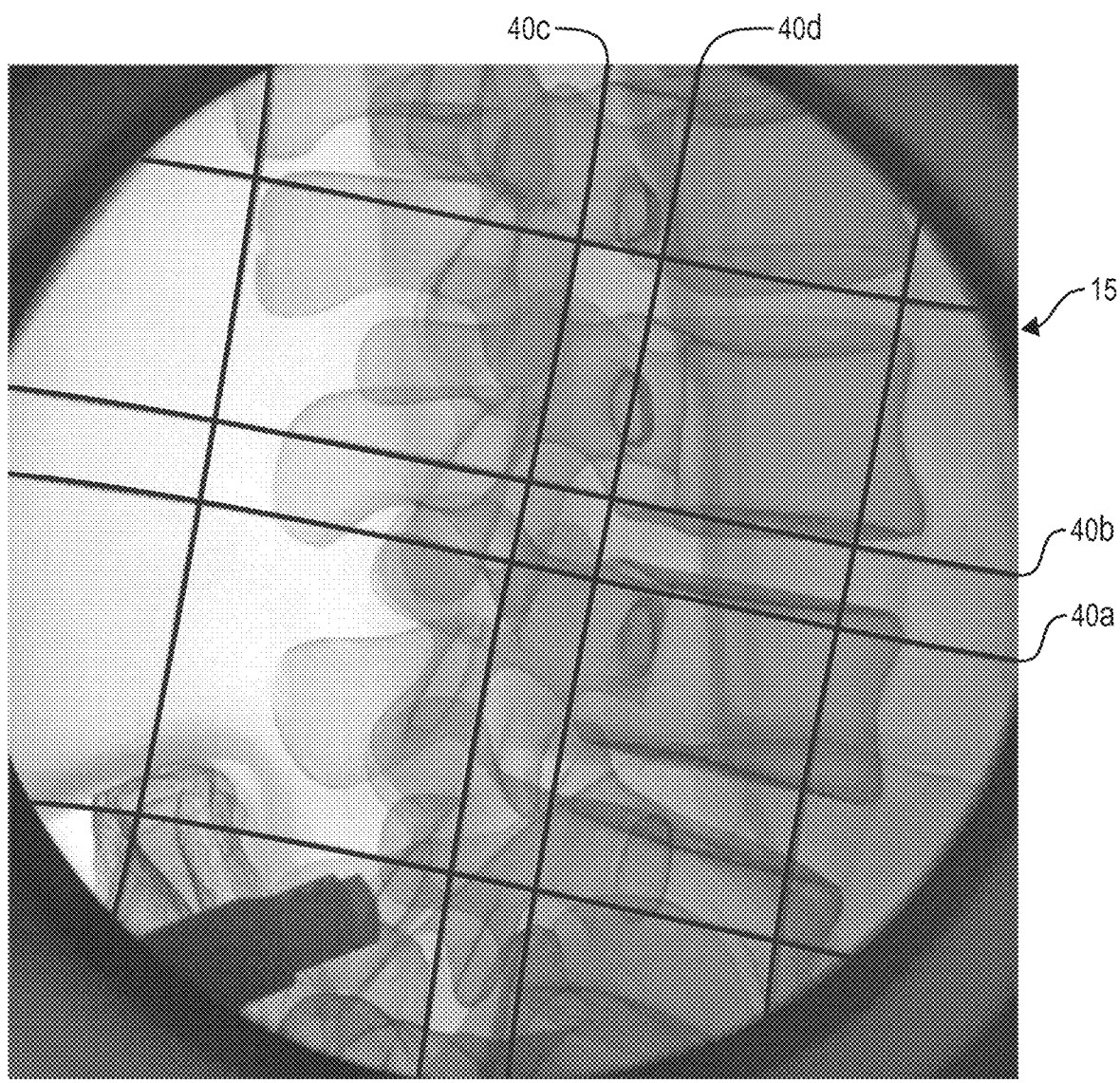
FIG. 7 is a typical "Lateral" X-ray image generated by a X-ray C-arm in the position of FIG. 6 when used in conjunction with a calibration target having linear markers transversing the radiographic image in accordance with the disclosure.

Calibration target 111, attachable to the radiographic image detector 115A, may be implemented with radiopaque wire markers embedded within the calibration target, as further described herein. The wires 40, as illustrated in FIG. 9-12 have known 3D spatial coordinates relative to reference marker 128 attached to the calibration target 111. Such wires are visible in the captured radiographic images, as illustrated in FIGS. 5 and 7 and used for calibrating the radiographic imaging system, including intrinsic correction of non-linear distortions, as explained herein.

Surgical Instrument(s) 119 may be equipped with optical markers or tracked using object recognition and 3D localization algorithms, as described further herein, and allow for real-time tracking and alignment within a 3D volume of CT quality images reconstruct from two radiographic image, e.g. X-rays.

Display interface 118 is operably coupled to computer 116 and provides real-time visual feedback to the surgical team, showing the precise positioning and movement of the patient, imaging system itself, and any instruments. A display interface 118 suitable for use is the 13" iPad Air, commercially available from Apple Computer, Inc. Cupertino, CA, USA, however, other commercially available surgical monitor may be used. As noted previously, the display interface may be located remotely from the computer 116 to facilitate more convenient positioning of the display interface 118 for the surgeon during the procedure.

The proposed system 110 revolutionizes the reconstruction of 3D volumes from X-ray images by integrating machine learning or deep learning techniques. System 110 is specifically designed to effectively reconstruct complete and accurate 3D volumes using a limited number of X-ray images, even when these images are obtained from a restricted angular range.

Wire-Based Calibration Target

Disclosed is a wire-based calibration target, comprising thin wires arranged in specific geometries at different depths within the body of the calibration target itself. Deep learning models detect the wires in the 2D X-ray images, generating labeled masks where each wire is assigned a unique label. This approach allows for precise polynomial fitting to the labeled pixels, accurate computation of crossover points, and generation of equally spaced points along the wires.

Figure 8:
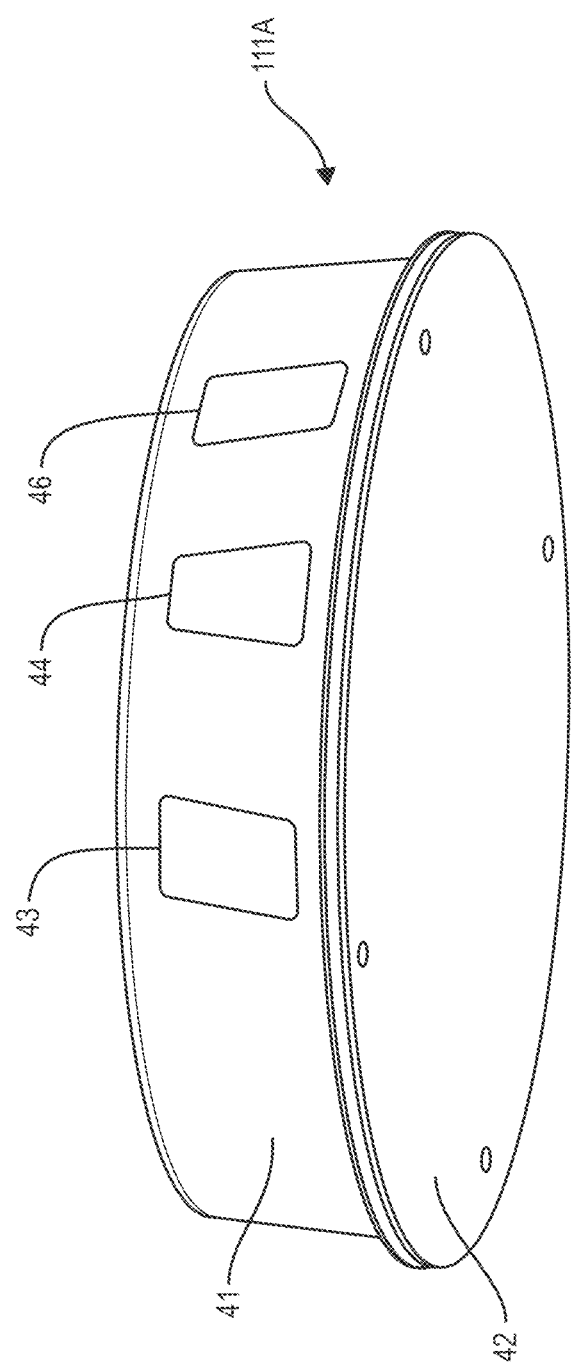
FIG. 8 is a conceptual perspective illustration of a calibration target apparatus in accordance with an illustrative embodiment.

In embodiments, the disclosed calibration target may have the exterior body configuration of target 111A of FIG. 8A. Calibration target 111A comprises a target body 41 having a substantially circular shape which is attachable directly to the radiation detector housing of an imaging system. A cover 42 is attached to target body 41 and made of a material that is essentially transparent to radiation incident thereon so as not to block such radiation from reaching the radiation detector. In embodiments, multiple reference elements 43, 44 and 46 are attached to or embedded into a sidewall or surface of target body 40. Each of elements 43, 44 and 46 may have a similar or different shape relative to the other of the elements, but each element 43, 44 and 46 has a unique position relative to the target body 41. In this manner, when viewed by a color or visible light camera, the unique geometry and surface texture of elements 43, 44, and 46 enables the target 111A to be easily distinguished from its surroundings, regardless of a camera angle(s), to enable precise tracking of the position and orientation of target 111A and radiation detector 1115A in a three-dimensional space.

In embodiments, the calibration target may have the exterior body configuration of marker 111B of FIG. 8B. Target 111B comprises a target body 151 having a substantially rectangular shape which is attachable directly to the radiation detector housing of an imaging system. Target 111B is substantially similar to target 111A in construction and function, except that the target body 151 has a substantially rectangular shape. A cover 152 is attached to target body 151 and made of a material that is essentially transparent to radiation incident thereon so as not to block such radiation from reaching the radiation detector. In embodiments, multiple reference elements 153, 154 and 156 are attached to or embedded into a sidewall or surface of target body 151. Each of elements 153, 154 and 156 may have a similar or different shape relative to the other of the elements, but each element 53, 54 and 156 has a unique position relative to target body 151. In this manner, when viewed by a color or visible light camera, the unique geometry and surface texture of elements 153, 154, and 156 enables the target 111B to be easily distinguished from its surroundings, regardless of a camera angle(s), to enable precise tracking of the position and orientation of target 111B and the radiation detector 1115B in three-dimensional space. With either of calibration targets 111A and 111B, illustrated herein, there is no need for a second reference marker 128 as previously described to determine the position of the imaging system to which the calibration target is attached since the reference elements 53, 54 and 56 collectively are detectable from the exterior of calibration target 111A or 111B.

Calibration target 111A comprises a target body 41 having a substantially circular shape which is attachable directly to the radiation detector housing of an imaging system. A cover 42 is attached to target body 41 and made of a material that is essentially transparent to radiation incident thereon so as not to block such radiation from reaching the radiation detector. In embodiments, multiple reference elements 43, 44 and 46 are attached to or embedded into a sidewall or surface of target body 41. Each of elements 43, 44 and 46 may have a similar or different shape relative to the other of the elements, but each element 43, 44 and 46 has a unique position relative to the target body 41. In this manner, when viewed by a color or visible light camera, the unique geometry and surface texture of markers 43, 44, and 46 enables the target 111A to be easily distinguished from its surroundings, regardless of a camera angle(s), to enable precise tracking of the position and orientation of target 111A and the radiation detector 115B in a three-dimensional space.

In embodiments, the target body may be made from a substantially rigid or semirigid material such as metals, plastics, vinyl or any synthetic polymers and may have a circular exterior shape, as illustrated, for attachment to the radiation detector of a C-arm X-ray machine, or, may have other shapes adapted to be secured within the path of radiation incident on the radiation detector of an imaging system. In embodiments, the target body 41 may be sixed and shaped for securing directly to a radiation detector of any number of currently commercially X-ray machines or future embodiments thereof.

Figure 9:
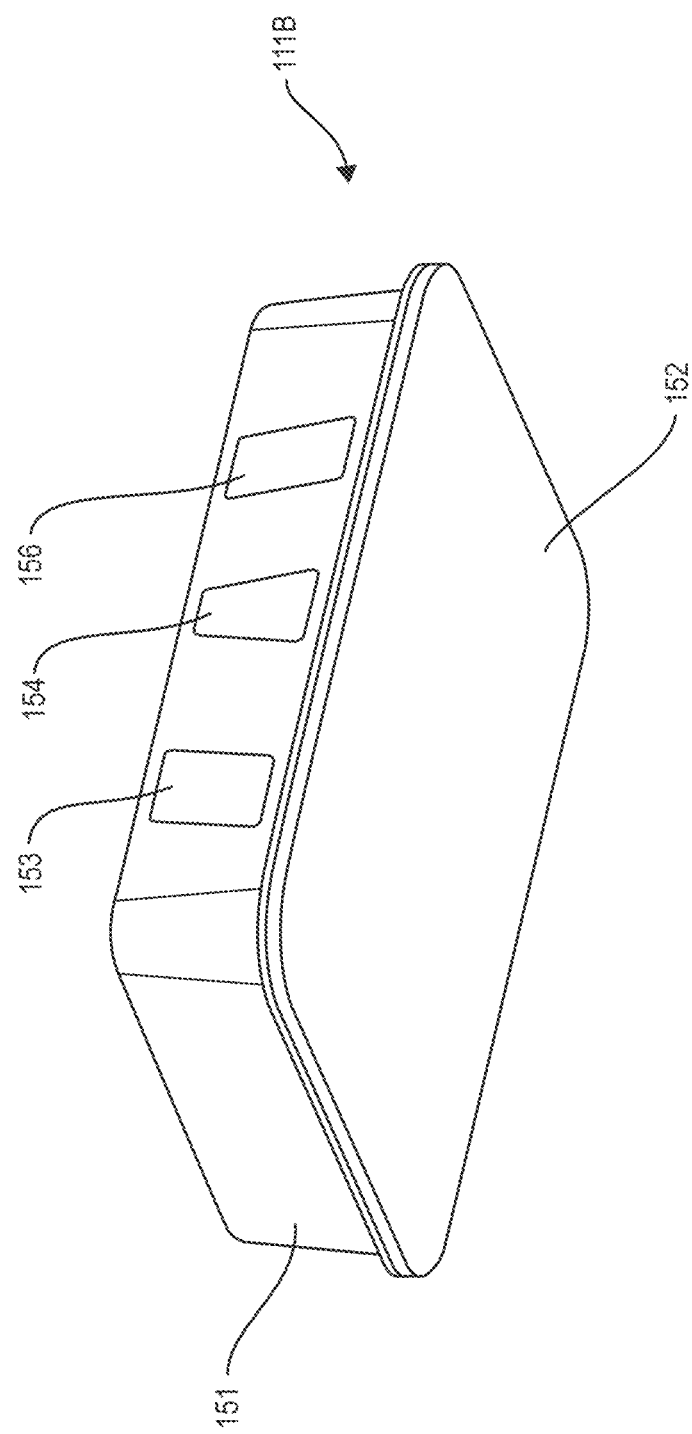
FIG. 9 is a conceptual perspective illustration of a calibration target apparatus in accordance with an illustrative embodiment.
Figure 10:
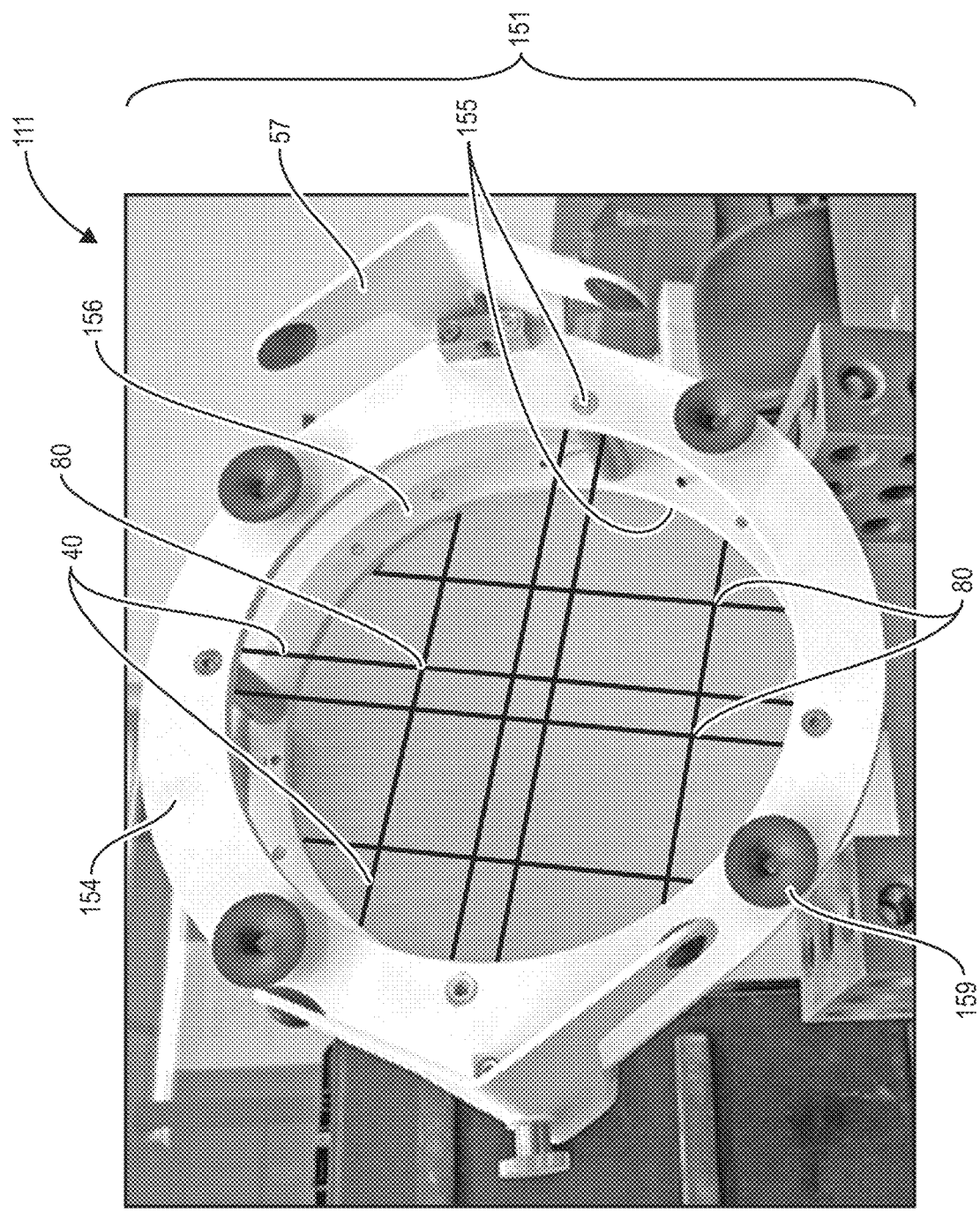
FIG. 10 is a perspective view of a calibration target apparatus in accordance with an illustrative embodiment.

FIGS. 9 and 10 are perspective and top views of a calibration target in accordance with the disclosure comprising a target body 151, a mounting mechanism 157, and a plurality of linear calibration markers 40 arranged in a known geometric pattern. Target body 151 comprises a pair of concentric ring-shaped frames 154 and 156 coupled together, but spaced apart, by posts 155, which collectively form the target frame defining an interior passage 159 along an axis extending through their respective centers. A plurality of pads or suction cups 159 are disposed on the side of ring 156 which will be positioned adjacent a radiation detector to help secure the calibration target 111A thereagainst.

The mounting mechanism 157 comprises a pair of brackets are attached to opposing sides of frames 156, each with an clamping block 158 and tightening screw 159 to allow manual tightening of brackets 157a-b to the radiation detector. In this manner, mounting mechanisms 157a-b facilitate removably securing calibration target 111A to the radiation detector of an imaging system.

In embodiments, target body 152 may be made from a substantially rigid or semirigid material and may have a circular exterior shape, as illustrated, for attachment to the radiation detector of a C-arm X-ray machine, or, may have other shapes adapted to be secured within the path of radiation incident on the radiation detector of an imaging system.

In embodiments, calibration markers 40 may be implemented with wires that may be made of all or partially radiopaque material (e.g., tungsten or steel) to ensure visibility in X-ray images. The wires 40 may be arranged at different known depths relative to the plane or face of the radiation detector to provide 3D spatial information. In embodiments, the wires may be positioned such that they are generally parallel to the face of the radiation detector, simplifying the projection geometry. In embodiments, the diameter of the wires is optimized to be large enough to be visible in the detected radiation images but small enough to occupy minimal pixel area to facilitate digital subtraction.

In embodiments, wires 40 may be implemented with Tungsten wires with diameter 0.5 mm, although other diameters may be used. In embodiments, wires 40 may be implemented with round wound or flat wound wires. Wires 45 may be placed at depths between z=0 mm and z=−50 mm relative to the calibration target origin. Wires 40 may be arranged in a grid pattern with known spacing, intersecting at known crossover points, as illustrated, although other intersecting wire patterns may be used.

The wires 40, as illustrated in FIGS. 9A-B have known 3D spatial coordinates relative to reference marker 128 or reference elements 43, 44, and 46 attached to the calibration target 111A. Such wires are visible in the captured radiographic images 5 and 15 and used for calibrating the radiographic imaging system, including intrinsic correction of non-linear distortions. With of calibration target 111A and 111B, illustrated herein, there is no need for second reference marker 128, as previously described, to determine the position of the imaging system to which the calibration target is attached, since the reference elements 43, 44, and 46 collectively are detectable from the exterior of calibration target 111A.

An additional advantage of the disclosed apparatus and method includes manufacturing efficiency and robustness. The wire-based target is easy to construct using simple metallic parts and wires, reducing production time and cost. High manufacturing repeatability eliminates the need for individual calibration of each target. The target is lightweight and durable, facilitating easy attachment to the C-arm detector and handling in clinical environments.

In addition to the description of the calibration apparatus itself, disclosed herein is a comprehensive mathematical modeling of the calibration process using lines detected via deep learning, algorithms for deep learning-based detection of wires and creation of labeled masks, methods for fitting polynomials to labeled wire pixels and computing crossover points with mathematical rigor, techniques for generating precise 2D to 3D point correspondences by sampling along fitted polynomials, methods for handling partial occlusions and missing wire segments using deep learning models, an analysis of the advantages of the wire-based method over traditional spherical marker-based calibration including distortion modeling and manufacturing benefits, and integration of the calibration process with 3D CT reconstruction from biplanar radiographic images.

Method of Operation

Figure 2A:
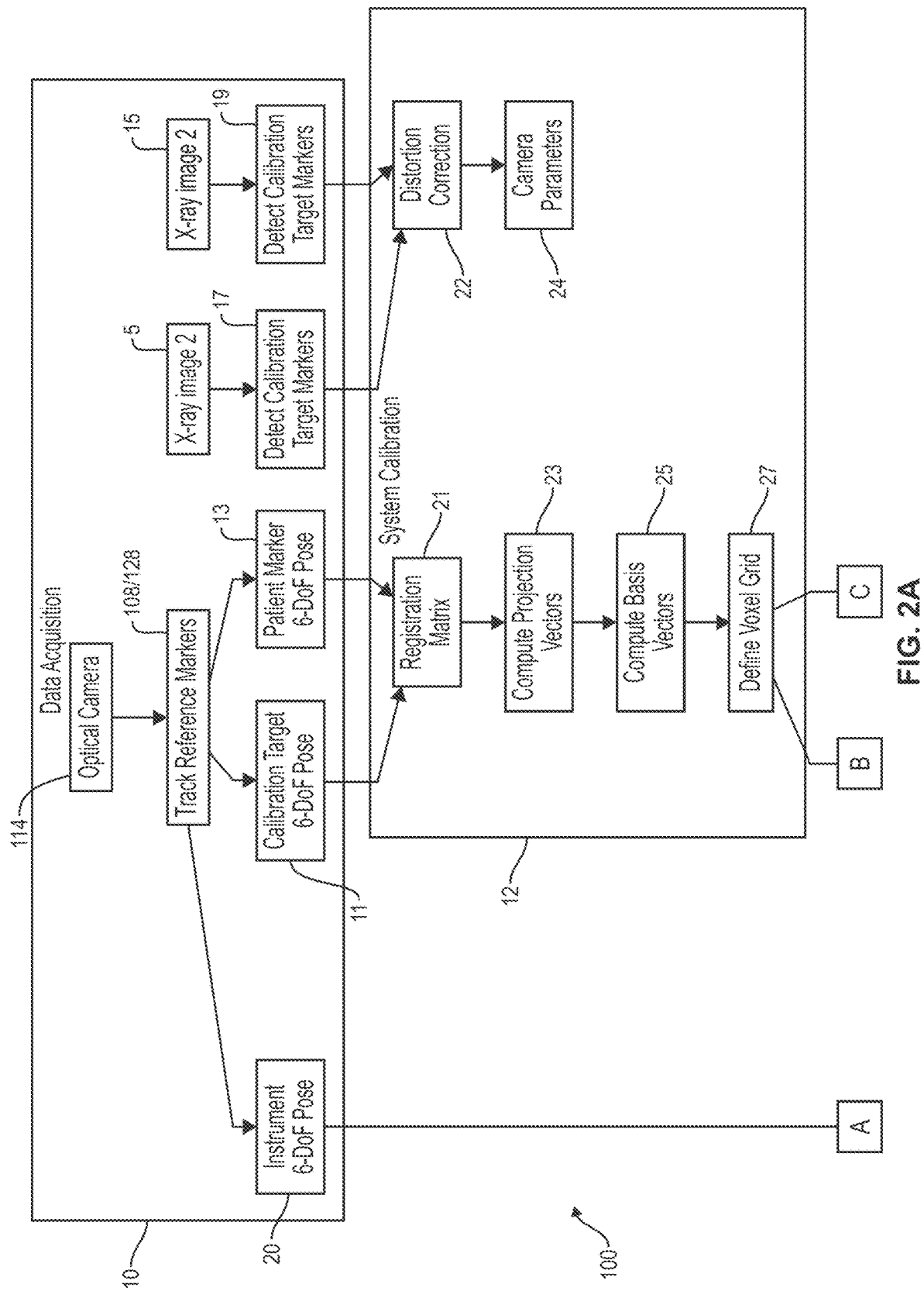
FIGS. 2A-B conceptually illustrate a more detailed process flow of the overall methods performed by the surgical navigation system in accordance with the disclosure.
Figure 2B:
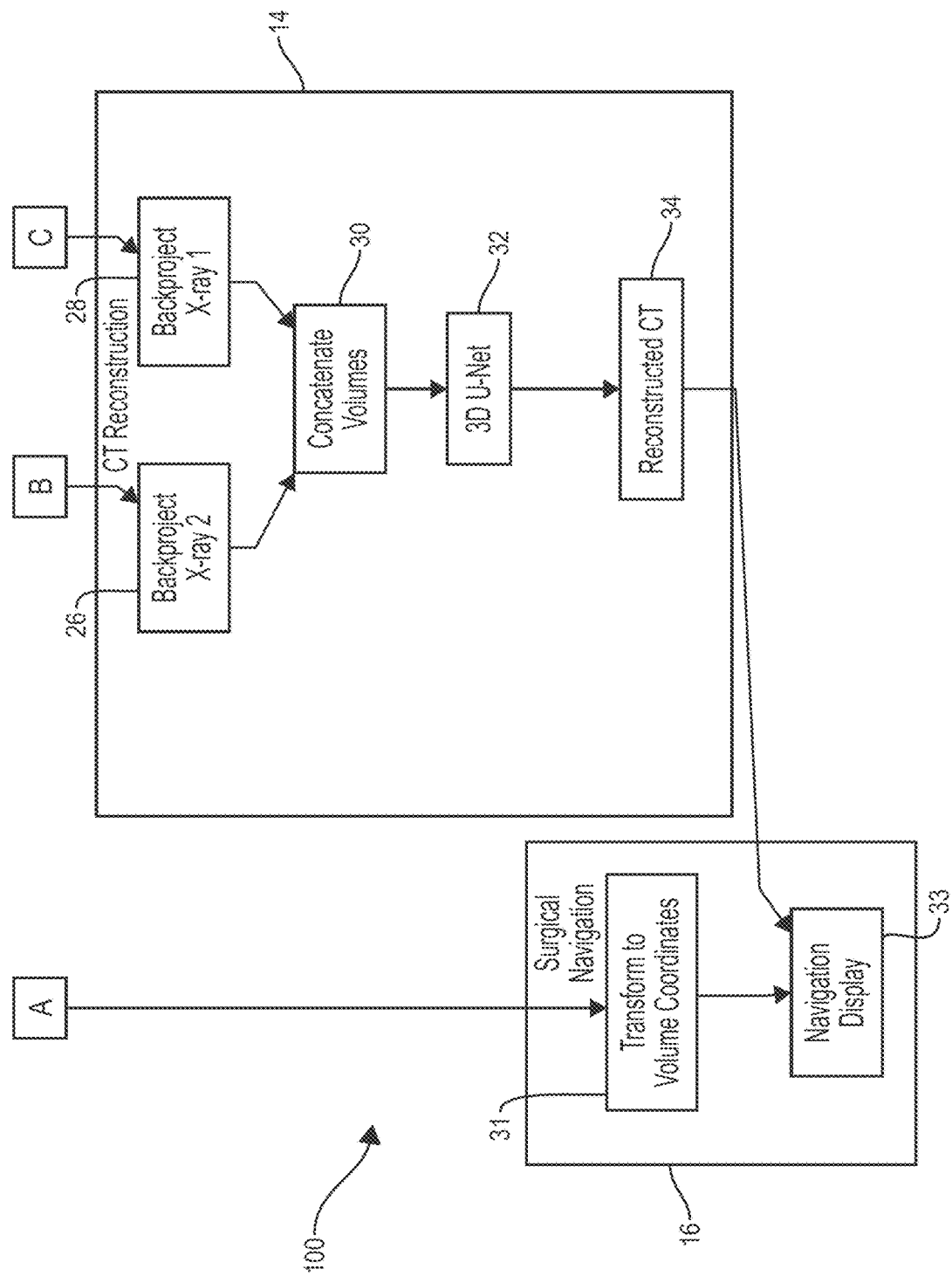

FIGS. 2A-B collectively illustrates a conceptual process flow 100 of the overall methods performed by the surgical navigation system 110 in accordance with the disclosure. Process flow 100 comprises a data acquisition phase 10, a system calibration phase 12, a CT volume reconstruction phase 14, and a surgical navigation phase 16. In initial setup, the camera 114 along with integrated radiation detection device 112 are positioned in the operating room within the surgical field. Reference marker 108 is disposed on or near the patient anatomy. Reference marker 128 is disposed on calibration target 111 which is attached to radiographic image detector 115A.

In the data acquisition phase 10, optical tracking of data for registration purposes is performed. Camera(s) 114 continuously capture images of the surgical field, including reference markers 108 and 128. Detection device 112 monitors levels of radiographic signals in the surgical field. When radiation source 115B is triggered, the radiation detection device 112 identifies radiation emissions as over a predetermined threshold and signals computer 116 to start capturing patient and calibration target pose information from the video streams cameras 114. Simultaneously, radiographic image detector 115A captures image 5, e.g. an X-ray. When the radiation detection device 112 indicates that the radiation emission has ended, computer 116 stops capturing pose information. Object recognition software applications within computer 116 recognize the reference markers 108 and 128 within the captured video data, as illustrated by process blocks 11 and 13, respectively, and records for each of the six degrees of freedom reference markers 108 and 128. At substantially the same time, radiographic image detector 115A generates X-ray image 5 which is provided to computer 116. Software algorithms within computer 116 recognizes calibration markers 40 within the X-ray image 5, as illustrated by process block 17. A similar process occur for X-ray image 15, as illustrated by process block 19.

Figure 13:
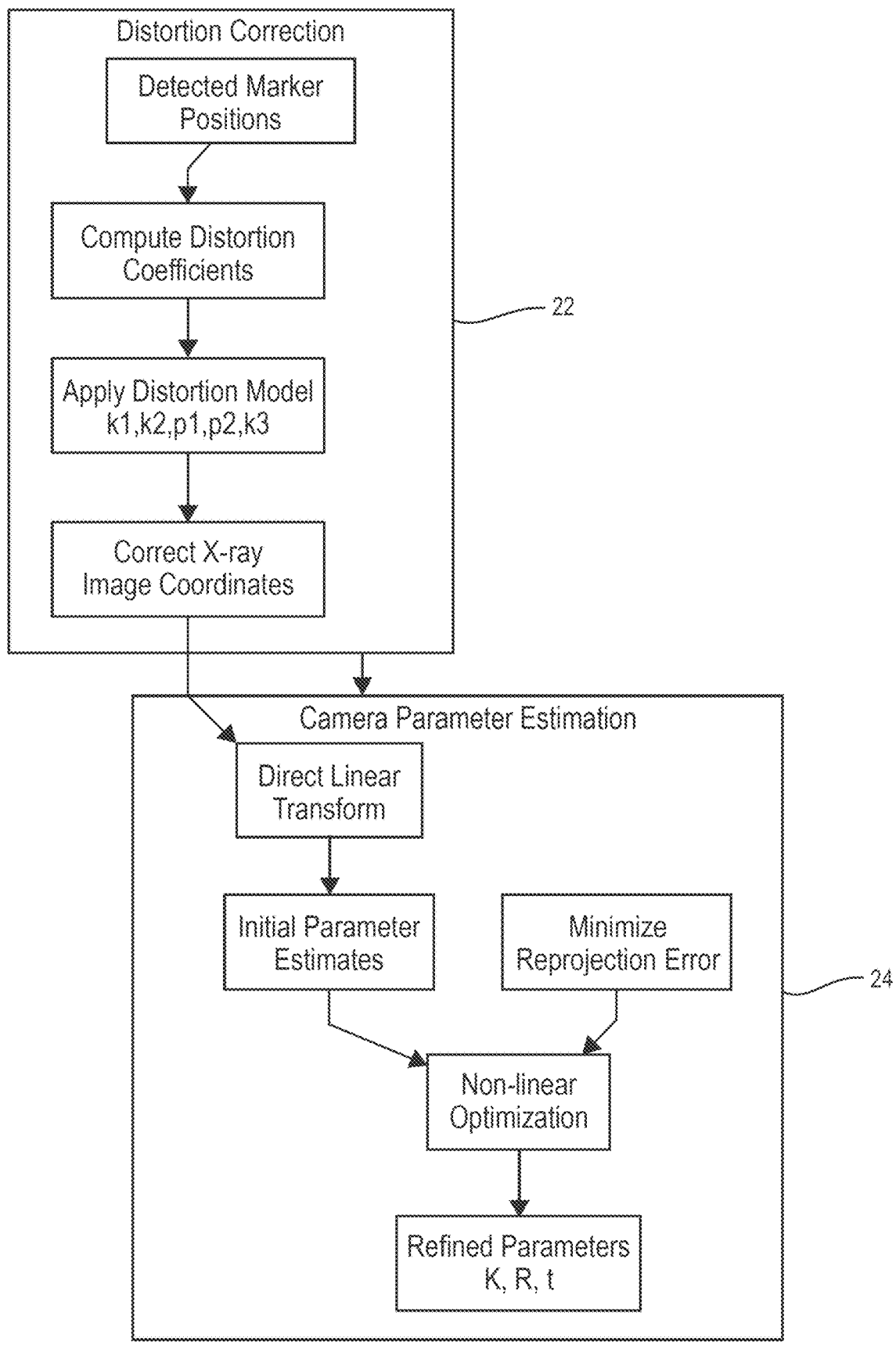
FIG. 13 is a conceptual sub-flow diagram of the distortion correlation and the camera parameter estimation processes of FIG. 2A in accordance with one illustrative embodiment.

Process blocks 21, 22, 23, 24, 25, 27 of FIG. 2A illustrate conceptually the process acts involved in system calibration and grid alignment according to the disclosure. FIG. 13 is a conceptual sub-flow diagram of the distortion correlation and the camera parameter estimation processes of FIG. 2A. The process acts and mathematical basis for the computer executable algorithms represented by process blocks 22 and 24 are explained in greater detail hereafter.

Object recognition software, such as Ultralytics YOLO, version 8 or higher, commercially available from www.Ultralytics.com, is used to capture positional information of a surgical instrument 119 relative to the processed pose information of the patient, as illustrated by process block 20. In the surgical navigation phase 16, as described in greater detail herein, the display interface 118 displays the real-time position and movement of surgical instruments relative to the patient, allowing the surgical team to make precise adjustments, without further capturing of patient pose information.

Figure 16A:
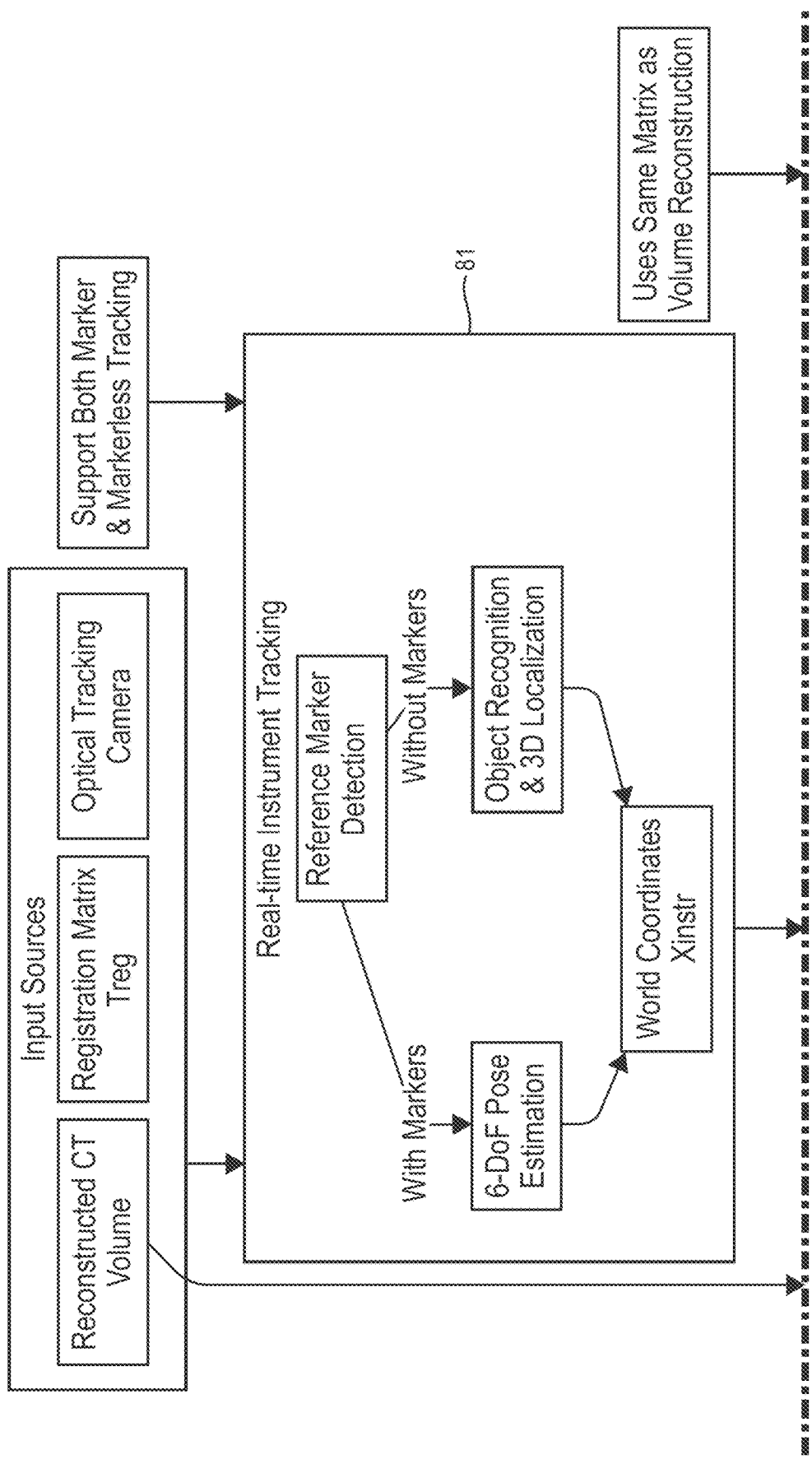
FIG. 16 is conceptual sub-flow diagram of the surgical navigation process processes of FIGS. 2A-B in accordance with one illustrative embodiment.
Figure 16B:
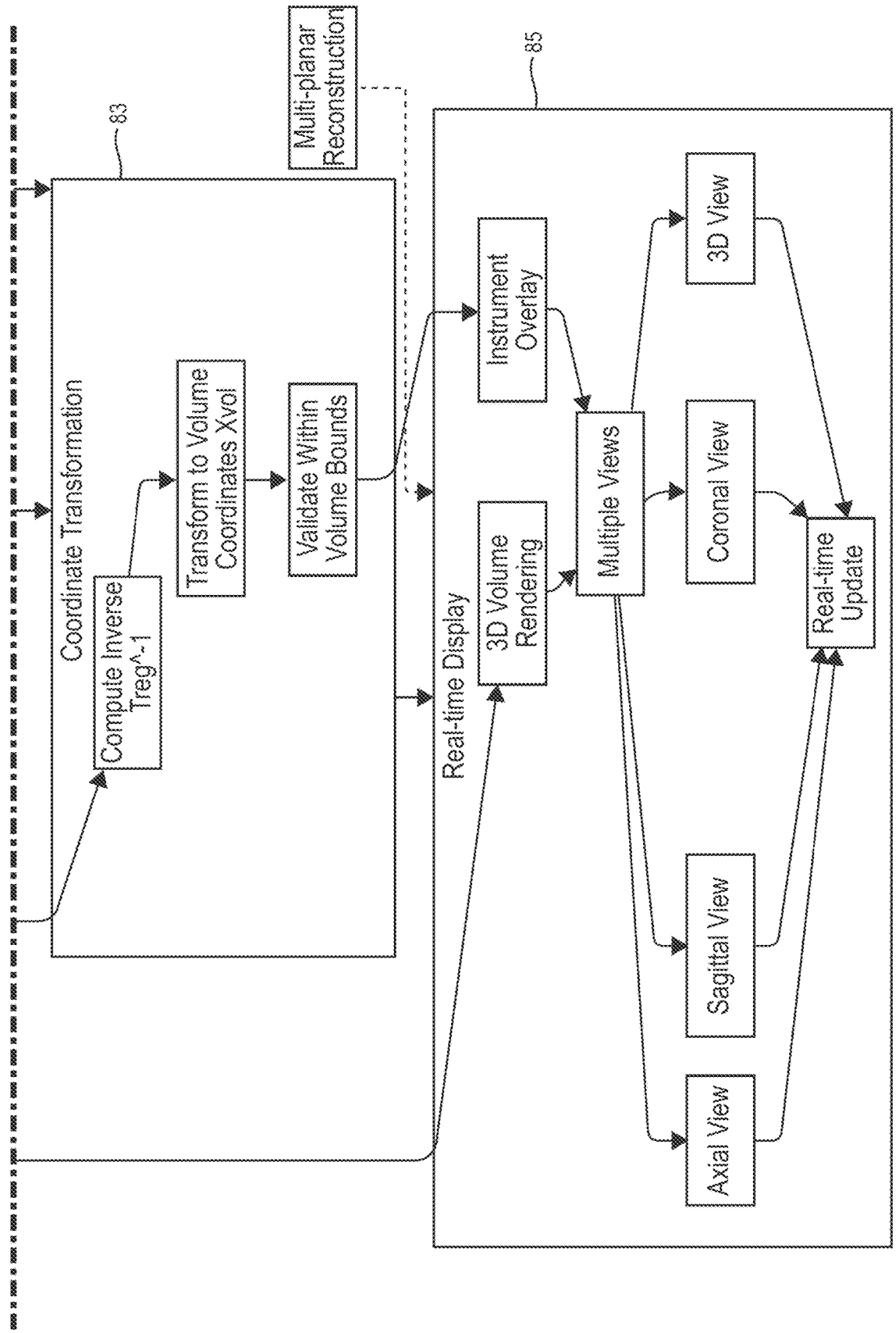

The process acts and mathematical basis for the computer executable algorithms represented by process blocks 11,13, 17,19, 22 and 24 are explained in greater detail with reference to FIG. 3 which illustrates a process flow 105 for automated reconstruction of a 3D CT volume from 2D X-ray images and display of real-time position and movement of surgical instruments and patient according to the present disclosure. The various acts of process flow 105 may be performed by execution of the computer program instructions 228 stored in the memory 224 and/or storage 227 and controlled by the processor 120 of computer 116, as illustrated in FIG. 16.

Figure 3:
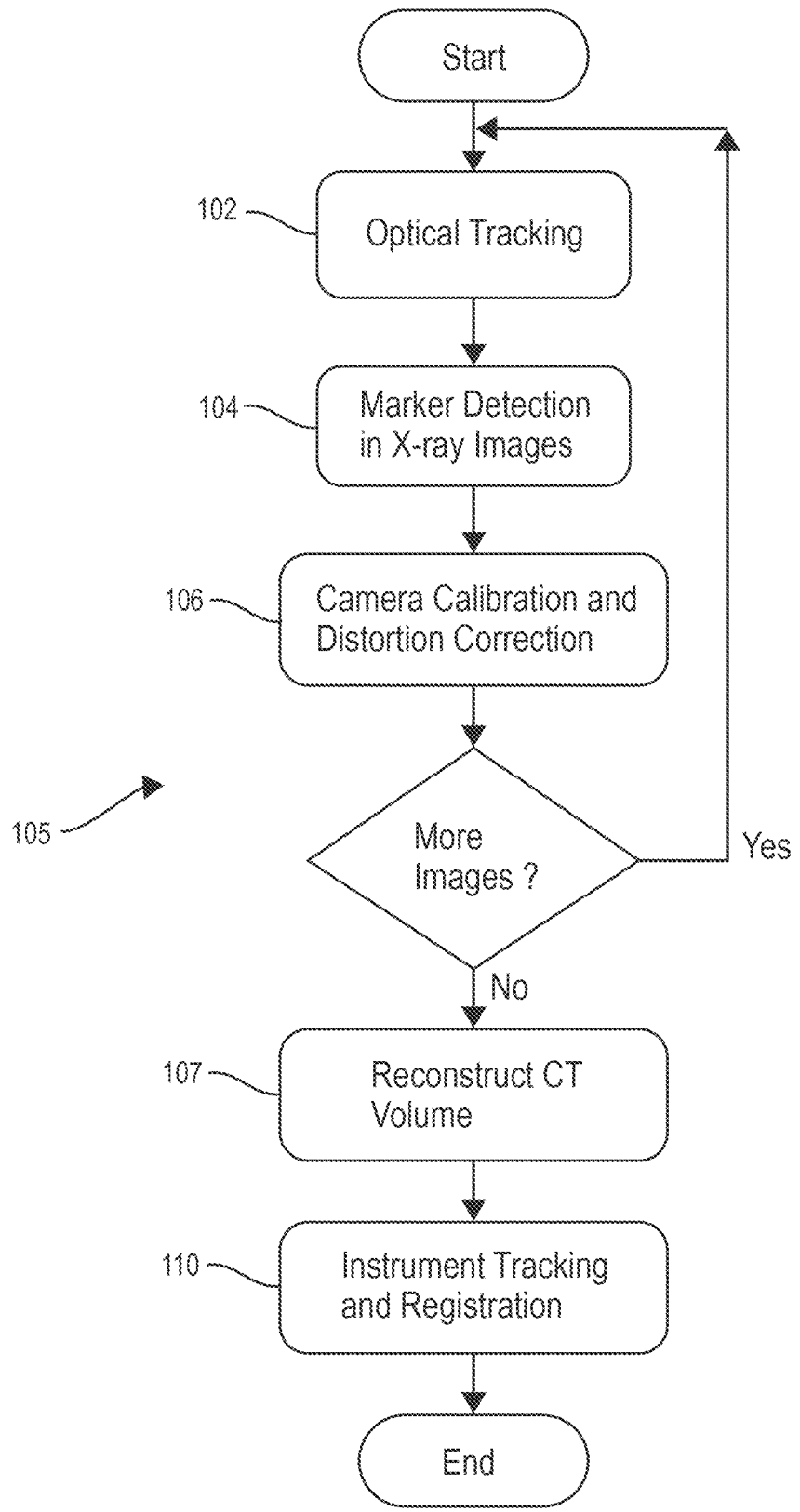
FIG. 3 conceptually illustrates a process flow of the overall methods performed by the surgical navigation system in accordance with the disclosure.
Figure 4:
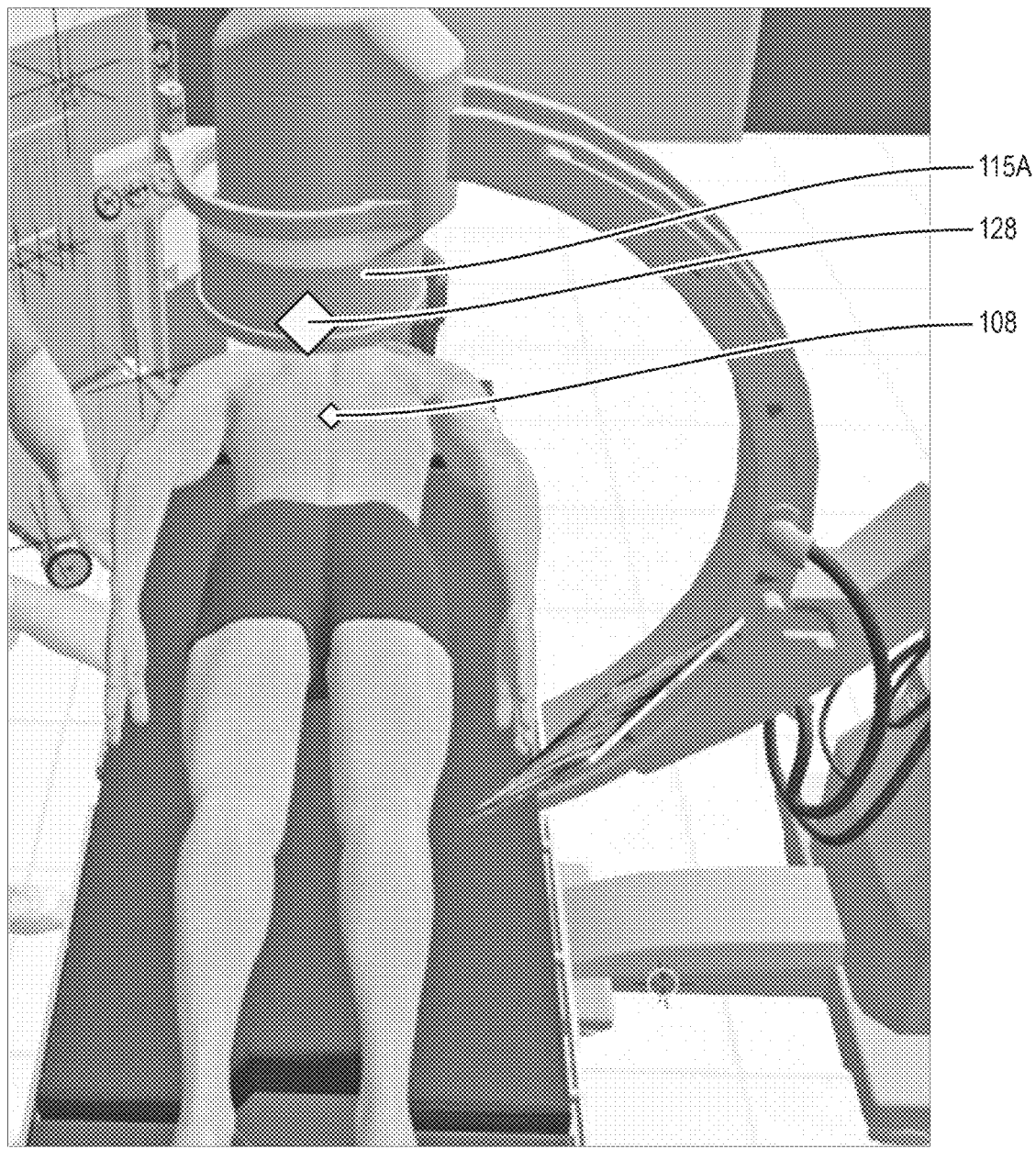
FIG. 4 is a conceptual illustration of the operating environment in which the X-ray C-arm of is posed in an Anterior/Posterior "AP" position in accordance with an illustrative embodiment.

The method of FIG. 3 requires only two 2D X-ray images to perform the reconstruction of the 3D CT volume, but the disclosed method is not limited thereto. The 2D X-ray images 5 and 15 can be obtained using a stand-alone X-ray scanner, a CT scanner, or a C-arm CT scanner. At the time of each 2D X-ray capture, the following process actions occur. At process block 102, optical tracking occurs, where the optical camera 114 detects the reference markers 108 and 128 and records the records the six degrees of freedom (6-DoF) ($R_p$, $t_p$) for the patient reference marker 108 and ($R_c$, $t_c$) for the calibration target marker 128. Optical camera 114 further tracks surgical instruments 119 either through markers attached to the instruments or using object recognition and 3D localization algorithms.

At process block 102, X-ray imaging occurs, with biplanar X-ray image 5 represented by $p_1(u, v)$. The calibration markers 40 within the calibration target 111A are visible in X-ray image 5. A similar process occurs for X-ray image 15 represented by $p_2(u, v)$. Images 5 and 15 captured from different orientations, typically at right angle to each. The calibration markers 40 within the calibration target 111A are also visible in X-ray image 15.

At process block 104, computer executable instructions detect the 2D positions $x_{i,k}^{distorted}$ of the intrinsic calibration markers wires 40 in each X-ray image 5 and 15. The positions of these wire 40 are associated with their known 3D coordinates $X_k$.

At process block 106, computer executable instructions perform camera calibration and distortion correction. Using the correspondences between $X_k$ and $x_{i,k}^{distorted}$, the intrinsic transform K, distortion parameters D, and extrinsic parameters ($R_i$, $t_i$) for each X-ray projection are computed. Non-linear distortions in the X-ray images are determined and corrected using the calibration wire markers 40, as further described herein.

At process block 110, computer executable instructions perform instrument tracking and registration occurs. The registration transform that transforms instrument coordinates into the volume coordinates is computed and the registration transform is used to track surgical instruments within the reconstructed 3D volume.

Method for Calibration of Radiographic Images

Disclosed herein is a description of the proposed method, including calibration target design, deep learning-based wire detection, polynomial fitting, and camera calibration procedure. The advantages of using wires over discrete markers are demonstrated through theoretical analysis and practical benefits in 3D CT reconstruction from biplanar radiographic images. The disclosed system improves calibration accuracy and efficiency in radiographic imaging systems, facilitating better integration with deep learning models for 3D reconstruction.

Disclosed is a wire-based calibration target, comprising thin wires arranged in specific geometries at different depths within the calibration object. Deep learning models detect the wires in the 2D X-ray images, generating labeled masks where each wire is assigned a unique label. This approach allows for precise polynomial fitting to the labeled pixels, accurate computation of crossover points, and generation of equally spaced points along the wires.

The calibration of radiographic images is a two-fold process involving both intrinsic and extrinsic parameters of the radiographic imaging device. Intrinsic calibration focuses on the internal characteristics of the radiographic imaging device, such as the lens distortions, focal length, and principal point. Such calibration ensures that the radiographic imaging system accurately interprets the dimensions and geometry of the images.

Extrinsic calibration addresses the spatial positioning and orientation of the radiographic imaging device and involves determining the relative 3D poses of the radiographic image subject. This is accomplished either through encoders integrated within the radiographic imaging system or via an external navigation system. The external system records the precise pose positions of the radiographic imaging device during the image capture process. The resulting pose positions are then used to accurately back-project the encoded images into the common coordinate system.

Such combination of intrinsic and extrinsic calibrations ensures that each X-ray image is precisely aligned in terms of both its internal geometry and its spatial orientation. This dual calibration approach is essential for accurate back-projection and reconstruction of the 3D volume. It addresses and overcomes the traditional challenges faced in 3D imaging, particularly in scenarios where only a limited number of images and a restricted range of angles are available. The resulting 3D volume is not only complete but also exhibits high resolution and accuracy, marking a significant improvement over conventional methods.

Registration Matrix Generation for Surgical Navigation System

Disclosed is a calibration target 111A with 40*i-n* wires, each placed at a known depth $z_k$, k=1, 2, ..., n. The wires are arranged in specific patterns to ensure that their projections in the 2D images provide sufficient information for accurate calibration. Key features of the geometric configuration include Crossover Points, e.g. the wires are positioned so that their projections intersect at known points (crossover points), enhancing the ability to compute precise correspondences, Spatial Distribution, e.g. the crossover points are distributed across the image plane to improve calibration accuracy by covering a wide range of image coordinates, Redundancy, e.g. multiple wires and crossover points provide redundancy, increasing robustness to occlusions or missing segments, and known 3D Coordinates, e.g. the 3D positions of the wires and crossover points are precisely known from the calibration target design.

The wire-based calibration target 111A offers several advantages over traditional spherical markers. The wire-based target 111A is easy to manufacture using simple, accurately machined rigid metallic parts. Wires are strung over these parts like a guitar, ensuring consistent geometry. Each calibration target can be manufactured with high repeatability, eliminating the need for individual measurements of each wire's position. The resulting target is robust and lightweight, making it easier to handle and attach to the C-arm detector. The wire-based target avoids Complex Measurement Procedures required by traditional spherical marker targets. The wires 40 occupy fewer pixels, making digital subtraction easier and reducing interference with anatomical structures. Wires can be detected using deep learning models, and unique labels can be assigned to each wire, simplifying the feature extraction process. Fitting polynomials to labeled wire pixels provides sub-pixel accuracy in localization. The structure allows for redundancy; missing segments can be reconstructed using deep learning, enhancing robustness to partial occlusions. The continuous nature of the wires, extending across the image, allows fitted polynomials to accurately capture and model image distortions, such as pincushion and S-curve distortions common in image intensifier systems. Equally spaced points along wires mitigate aliasing effects, improving calibration accuracy.

In embodiments, wire arrangements can be tailored to specific calibration requirements with additional wires and crossover points included to increase robustness.

The following notation is provided to formalize the mathematical modeling of the computations described hereafter:

$X=[X, Y, Z, 1]^T$: Homogeneous coordinates of a 3D point in the calibration target coordinate system.

$x=[u, v, 1]^T$: Homogeneous coordinates of a 2D point in the image plane.

K: Intrinsic camera matrix of the X-ray imaging system, capturing focal lengths and principal point.

D: Distortion coefficients modeling lens distortions.

R, t: Rotation matrix and translation vector (extrinsic parameters) relating the calibration target and the X-ray imaging system.

$\pi(X)$: Projection function mapping a 3D point to a 2D image point.

W: Set of wires in the calibration target.

I: Labeled mask image where each pixel is assigned a label corresponding to a wire or background.

$l_i$: Fitted polynomial curve representing wire i in the image plane.

xcross: Crossover point between two wires in the image plane.

Xcross: Corresponding 3D point of the crossover in the calibration target.

Deep Learning-Based Wire Detection

Figure 12:
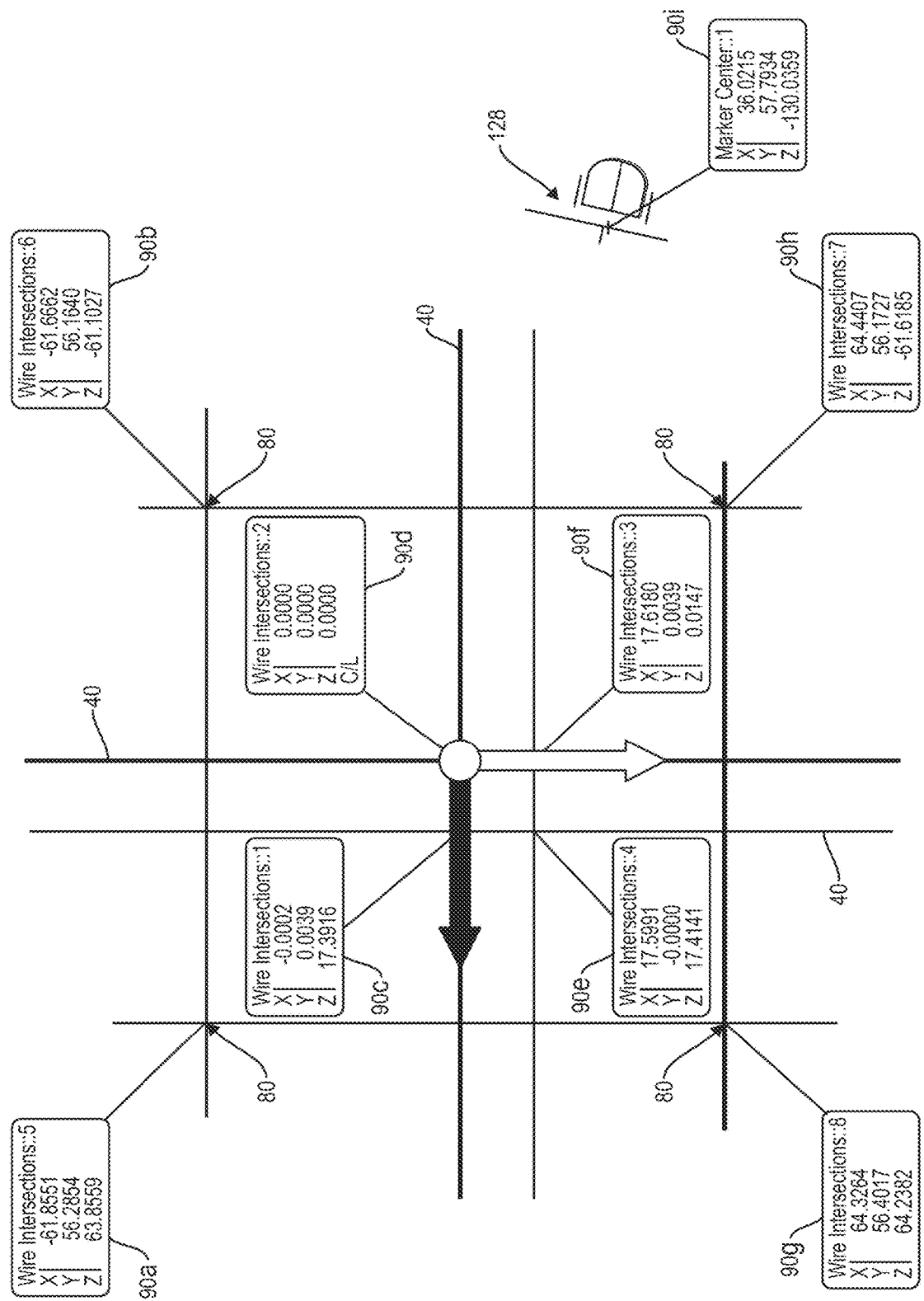
FIG. 12 illustrates conceptually the tag mask tags generated to identify intersection points of calibration targets in accordance with the disclosure.

A trained deep learning model 95 capable of segmenting the wires from the background, assigning unique labels to each wire, and reconstructing missing segments in case of partial occlusions, is employed to accurately detect wires 40 in the 2D X-ray images, as illustrated in FIGS. 5 and 7, and generate a labeled mask where each wire 40 is assigned a unique integer label 90*a-h*, as illustrated in FIG. 12. In practical scenarios, wires 40 may be partially occluded or exhibit low contrast due to anatomical structures overlapping the wires, noise and scattering in the X-ray imaging system, and variations in exposure and contrast settings. Post-Inpainting processing, as described herein, may include smoothing by applying filters to reduce any artifacts introduced during inpainting, and normalization by adjust image intensity levels if necessary. The resulting image is free of calibration features and suitable for back-projection in 3D reconstruction.

In embodiments, the deep learning model 95 may be trained to detect visible wire segments with high accuracy, predict the presence of wires in occluded or low-contrast regions, and assign consistent labels to wires, even when segments are missing. Such functionality is achieved with a training procedure which includes training samples with varying degrees of occlusion and noise, use of data augmentation techniques to simulate real-world imaging conditions, and employing loss functions that penalize both false negatives and false positives, such as the Dice loss. During inference the model outputs a labeled mask i with reconstructed wire segments. The subsequent polynomial fitting and calibration steps proceed using the complete set of detected wire pixels.

The following pseudocode algorithm outlines how a trained deep learning model is used to detect wires in 2D X-ray images and generate labeled masks.

---
Algorithm 4 Deep Learning-Based Wire Detection
---
Require: Trained deep learning model M, input X-ray image I
Ensure: Labeled mask image I
1:     Preprocess the input image I (normalization, resizing if necessary)
2:     $\hat{I} \leftarrow M(I)$     ▷ Predict the wire mask using the model
3:     Postprocess $\hat{I}$ to obtain discrete labels
4:         Assign unique labels to connected components corresponding to each wire
5:     return I
---

Polynomial Fitting to Labeled Pixels may occur as follows: For each wire label i, extract the set of pixel coordinates:

$$P_i = \{(u_j, v_j) \mid I(u_j, v_j) = i\} \quad (1)$$

The X-ray images have their own coordinate system, typically with the origin at the top-left corner, so care must be taken to ensure consistency when processing the pixel coordinates. Next, the variance of the u and v coordinates is computed as follows in Equation (2):

$$\sigma_u^2 = \text{Var}(\{u_j\}), \; \sigma_v^2 = \text{Var}(\{v_j\}) \quad (2)$$

If $\sigma_u^2 < \sigma_v^2$, the wire is closer to vertical; fit u as a function of v.

If $\sigma_v^2 < \sigma_u^2$, the wire is closer to horizontal; fit v as a function of u.

Polynomial fitting may be done with the polynomial fitting and least squares fitting procedures illustrated with Equation (3) and (4), respectively. To fit u as a function of v (the procedure is analogous for the other case), fit a polynomial of degree d:

$$u = f_i(v) = a_{i,0} + a_{i,1}v + a_{i,2}v^2 + \ldots + a_{i,d}v^d \quad (3)$$

The coefficients $\{a_{i,k}\}$ are determined by minimizing the sum of squared residuals:

$$\min_{\{a_{i,k}\}} \sum_j (u_j - f_i(v_j))^2 \quad (4)$$

The above polynomial regression problem can be solved using linear algebra techniques.

As illustrated in FIG. 13, process block 22 illustrates the process for distortion correction as including the sub processes of detecting marker positions, computing distortion coefficients, applying the distortion model, and correcting x-ray image coordinates. Further, process block 24 illustrates the process for camera parameter estimation as including the sub processes of direct linear transformation, initial parameter estimates, minimizing reprojection error, non-linear optimization and refining parameters, as illustrated in FIG. 13.

Modeling Image Distortions

As illustrated in FIG. 12, intersection points 80 of wires 40 are assigned an integer tag value 90 which identifies the wire in three-dimensional space (x, y, z). The continuous nature of the wires, transversing or extending across at least part of the image, enables the fitted polynomials to capture image distortions inherent in the imaging system. In image intensifier C-arm systems, distortions such as pincushion and S-curve distortions can significantly affect the accuracy of the projected wire positions. By fitting polynomials to the entire length of the lines or linear obstructions, caused by the wires 40 in the images 5 or 15, modelling these distortions accurately over different regions of the image is possible. This modeling provides valuable information about the distortion characteristics of the radiographic imaging system, allowing for correction during calibration. The fitted polynomials effectively serve as distortion maps, capturing both global and local distortion effects.

The following pseudocode algorithm describes how polynomials are fitted to the labeled pixels for each wire.

---
Pseudocode - Polynomial Fitting to Labeled Pixels
---
Require: Labeled mask image I, degree of polynomial d
Ensure: Fitted polynomials $\ell_i$ for each wire i
1:     for each wire label i in I do
2:         Extract pixels $P_i = \{(u_j, v_j) \mid I(u_j, v_j) = i\}$
3:         Compute variances $\sigma_u^2, \sigma_v^2$ of $u_j, v_j$
4:         if $\sigma_u^2 < \sigma_v^2$ then
5:             Fit $u = f_i(v)$ using polynomial regression of degree d
6:             Set fit direction to 'vertical'
7:         else
8:             Fit $v = f_i(u)$ using polynomial regression of degree d
9:             Set fit direction to 'horizontal'
10:        end if
11:        Store fitted polynomial $\ell_i$ and fit direction
12:    end for
13:    return $\{\ell_i\}$
---

To compute crossover points, identification of wire pairs is necessary. Knowledge of which wires intersect is known from the design of the calibration target 111. If C is the set of wire pairs that intersect:

$$C = \{(i, j) \mid \text{Wires } i \text{ and } j \text{ intersect}\} \quad (5)$$

For computing intersection points, for each pair $(i,j) \in C$:

Retrieve the fitted polynomials $l_i$, and $l_j$, along with their fit directions.

Determine the parameter variable s:
  If both polynomials are functions of v, set s=v.
  If both are functions of u, set s=u.
  If one is $u=f_i(v)$ and the other is $v=f_j(u)$, choose appropriate substitution.

Define the function whose root corresponds to the crossover:

$$F(s) = \ell_i(s) - \ell_j(s) \quad (6)$$

Use numerical root-finding methods (e.g., Newton-Raphson, bisection) to solve $$F(s) = 0 \text{ for } s_{cross}.$$

Compute the crossover point coordinates:
If fit direction is 'vertical':

$$v_{cross} = s_{cross}, u_{cross} = \ell_i(s_{cross}) \quad (7)$$

If fit direction is 'horizontal':

$$u_{cross} = s_{cross}, v_{cross} = \ell_i(s_{cross}) \quad (8)$$

Store the crossover point $x_{cross} = (u_{cross}, v_{cross})$.

The disclosed polynomial fitting allows modelling of a wire's trajectory with sub-pixel precision for accurate calibration.

The following pseudocode describes an the algorithm for computing the crossover points between pairs of fitted polynomials.

---

Pseudocode - Computing Crossover Points

---

Require: Fitted polynomials $\ell_i$, fit directions, list of wire pairs C, initial guesses for crossover parameters
Ensure: Crossover points $x_{cross}$
1: for each pair (i, j) in C do
2:   Retrieve polynomials $\ell_i$, $\ell_j$ and fit directions
3:   Determine the variable of parameterization s (either u or v)
4:   Define function F (s) = $\ell_i$(s) − $\ell_j$(s)
5:   Use numerical root-finding to solve F (s) = 0 for $s_{cross}$, starting from initial guess
6:   if fit direction is 'vertical' then
7:     $v_{cross} \leftarrow s_{cross}$
8:     $u_{cross} \leftarrow \ell_i(s_{cross})$
9:   else
10:    $u_{cross} \leftarrow s_{cross}$
11:    $v_{cross} \leftarrow \ell_i(s_{cross})$
12:   end if
13:   Store crossover point $x_{cross} = (u_{cross}, v_{cross})$
14: end for
15: return $\{x_{cross}\}$

---

Generation of Equally Spaced Points Along Wires

An additional advantage of the disclosed apparatus and method includes robustness to aliasing and noise. Polynomial fitting reduces the impact of pixel-level noise by smoothing over multiple points. Equidistant sampling mitigates aliasing effects by providing consistent sampling along the wires.

In embodiments, a deep learning model 95 previously trained to predict the locations of the wires 40 in the X-ray images 5 or 15 may be utilized. Multiple possible architectures can be used for this task, including: 1) Fully Convolutional Networks (FCNs) designed for pixel-wise segmentation, capable of outputting segmentation masks corresponding to the wires; 2) U-Net, an encoder-decoder architecture with skip connections, effective in biomedical image segmentation; 3) DeepLab, employing atrous convolutions and spatial pyramid pooling to capture multi-scale context; 4) Mask R-CNN, combining object detection and instance segmentation, is useful if individual wire instances need to be distinguished. The choice of architecture depends on factors such as the complexity of the images, computational resources, and the level of detail required in the segmentation.

In embodiments, the training procedure for deep learning model 95 may include dataset preparation, e.g. collecting a dataset of X-ray images with corresponding ground truth labeled masks $I_{gt}$, and masks assignin unique labels to each wire; data augmentation, e.g. applying transformations such as rotations, scaling, flipping, and noise addition to enhance model robustness to variations; loss function, e.g. using suitable loss functions for segmentation tasks, such as categorical cross-entropy loss, Dice loss, or focal loss; and optimization, e.g. training the model using an optimizer or stochastic gradient descent (SGD) with an appropriate learning rate schedule, and monitoring validation loss and metrics to prevent overfitting.

During inference, the trained model predicts a segmentation mask for a given X-ray image. Post-processing steps may include thresholding the output probabilities to obtain binary masks, applying connected component analysis to assign unique labels to each wire, and morphological operations to refine the segmentation (e.g., erosion, dilation).

To defining the parameter range, for each wire i, define the parameter range based on the crossover points associated with the wire:

Let s be the parameter along the wire (either u or v).
Determine $s_{min}$ and $s_{max}$ from the crossover points and extend by a margin to include endpoints.

To set equidistant sampling, generate N equally spaced parameter values:

$$s_k = s_{min} + \left(\frac{k}{N-1}\right)(s_{max} - s_{min}), k = 0, 1, \ldots, N-1 \quad (9)$$

Next, compute the corresponding image coordinates:

$$\begin{cases} u_k = f_i(s_k), & \text{if fitting } u = f_i(s) \\ v_k = f_i(s_k), & \text{if fitting } v = f_i(s) \end{cases} \quad (10)$$

By sampling points at equal intervals along the wire, the impact of pixel quantization and aliasing are reduced, resulting in more accurate calibration correspondences.

Correspondence Between 2D Image Points and 3D Calibration Points

Known 3D Positions of Wires

For each wire i, the 3D parametric equation of the wire in the calibration target coordinate system is known:

$$X_i(t) = X_{i,0} + td_i, \; t \in [t_{min}, t_{max}] \quad (11)$$

where:
- $X_{i,0}$: Starting point of wire i.
- $d_i$: Direction vector of wire i.
- t: Parameter along the wire.

To mapping parameter values the parameter values $s_k$ used in the image domain are mapped to the corresponding parameter values $t_k$ in the 3D domain by using crossover points to establish correspondences:

Use the crossover points to establish correspondences:

$$s_{cross,1} \leftrightarrow t_{cross,1}, \; s_{cross,2} \leftrightarrow t_{cross,2} \quad (12)$$

Compute the Mapping:

$$t_k = t_{cross,1} + \left( \frac{s_k - s_{cross,1}}{s_{cross,2} - s_{cross,1}} \right)(t_{cross,2} - t_{cross,1}) \quad (13)$$

The 3D coordinates may be computed using the following formula:

$$X_k = X_i(t_k) = X_{i,0} + t_k d_i \quad (14)$$

Resulting in a set of correspondences useful in the calibration process:

$$\{(x_k, X_k)\} \quad (15)$$

Camera Calibration with Line Features

The objective of calibration is to estimate the intrinsic parameters K, distortion coefficients D, and extrinsic parameters (R, t) of the X-ray imaging system by minimizing the reprojection error over the set of correspondences. The projection of a 3D point X onto the ideal (undistorted) image plane is given by:

$$x = \pi(K, R, t, X) = K(RX + t) \quad (16)$$

The observed (distorted) image point is:

$$x^{distorted} = \text{Distort}(x, D) \quad (17)$$

where Distort(•) applies the distortion model to the ideal image point x.

A common distortion model useful with the disclosed process includes radial and tangential distortions:

Radial Distortion:

$$x_{dist} = x(1 + k_1 r^2 + k_2 r^4 + k_3 r^6) \quad (18)$$
$$y_{dist} = y(1 + k_1 r^2 + k_2 r^4 + k_3 r^6)$$

where $r^2 = x^2 + y^2$.

Tangential Distortion:

$$x_{dist} = x + (2 p_1 xy + p_2(r^2 + 2x^2)) \quad (19)$$
$$y_{dist} = y + (p_1(r^2 + 2y^2) + 2 p_2 xy)$$

The distortion coefficients $D = [k_1, k_2, k_3, p_1, p_2]^T$ are to be estimated.

The reprojection error E is defined as the sum of squared differences between the observed and predicted image points:

$$E = \sum_k \left\| x_k^{distorted} - \text{Distort}(\pi(K, R, t, X_k), D) \right\|^2 \quad (20)$$

In embodiments, an optimization process includes initialization, nonlinear optimization, calibration algorithms and evaluation of calibration accuracy. For optimization initialization, initialize the intrinsic matrix K with estimated focal lengths and principal point based on image dimensions; set initial distortion coefficients D to zero or small values; and initialize R and t based on approximate alignment between the calibration target and the imaging system. Nonlinear Optimization may be achieved by use a nonlinear least squares optimizer, e.g., Levenberg-Marquardt algorithm, to minimize E with respect to K, D, R, and t. Depending on prior knowledge, constraints can be applied such as: fix the principal point if known, assume zero skew (i.e., pixels are rectangular), and enforcing aspect ratio constraints if the pixel dimensions are known. These constraints can be specified using flags in the optimization function.

OpenCV's calibrateCamera function is commonly used for camera calibration and supports various flags and options to specify constraints and models. After optimization, the calibration accuracy may b e evaluated by computing the root mean square error (RMSE) of the reprojection error:

$$RMSE = \sqrt{\frac{1}{N} E} \quad (21)$$

A lower RMSE indicates better calibration accuracy.

Digital subtraction of wires from X-ray images is achieved through mask generation and inpainting processes. For mask generation use the labeled mask I, a binary mask M is created where:

$$M(u, v) = \begin{cases} 1 & \text{if } \mathcal{I}(u, v) > 0 \\ 0 & \text{otherwise} \end{cases} \quad (22)$$

Inpainting Techniques

Next, inpainting algorithms is applied to fill in the regions corresponding to the wires 40 in the image. The following pseudocode outlines the steps to inpaint the X-ray image by removing the wires.

| Pseudocode - Inpainting the X-ray Image |
|---|
| Require: Original X-ray image I, labeled mask image I |
| Ensure: Inpainted image $I_{inpainted}$ |
| 1:      Generate binary mask M where M(u, v) = 1 if I(u, v) > 0, else 0 |
| 2:      Choose an inpainting algorithm (e.g., Telea's algorithm) |
| 3:      Apply inpainting algorithm to I using mask M to obtain $I_{inpainted}$ |
| 4:      return $I_{inpainted}$ |

Other possible possibly inpainting algorithms include Telea's Algorithm—a fast marching method that propagates known pixel values into the masked region, or Navier-Stokes Inpainting—a method of using fluid dynamics equations to smoothly fill in missing regions.

Advantages of the disclosed apparatus and method include improved calibration accuracy. Polynomial fitting provides high-precision localization of the calibration target wire features. Equally spaced points along wires result in a large number of correspondences, enhancing calibration robustness. Continuous wires allow for accurate modeling and correction of image distortions, such as pincushion and S-curve distortions common with radiographic image detector used with image intensifier systems. The fitted polynomials capture these distortions over different regions of the image, improving overall calibration accuracy. An additional advantage of the disclosed apparatus and method include is ease of digital subtraction. Thin wires occupy minimal area, making digital subtraction straightforward. Small masked regions can be effectively in-painted without introducing significant artifacts.

Reconstruction of 3D CT Volumes from X-ray Projections

Figure 14:
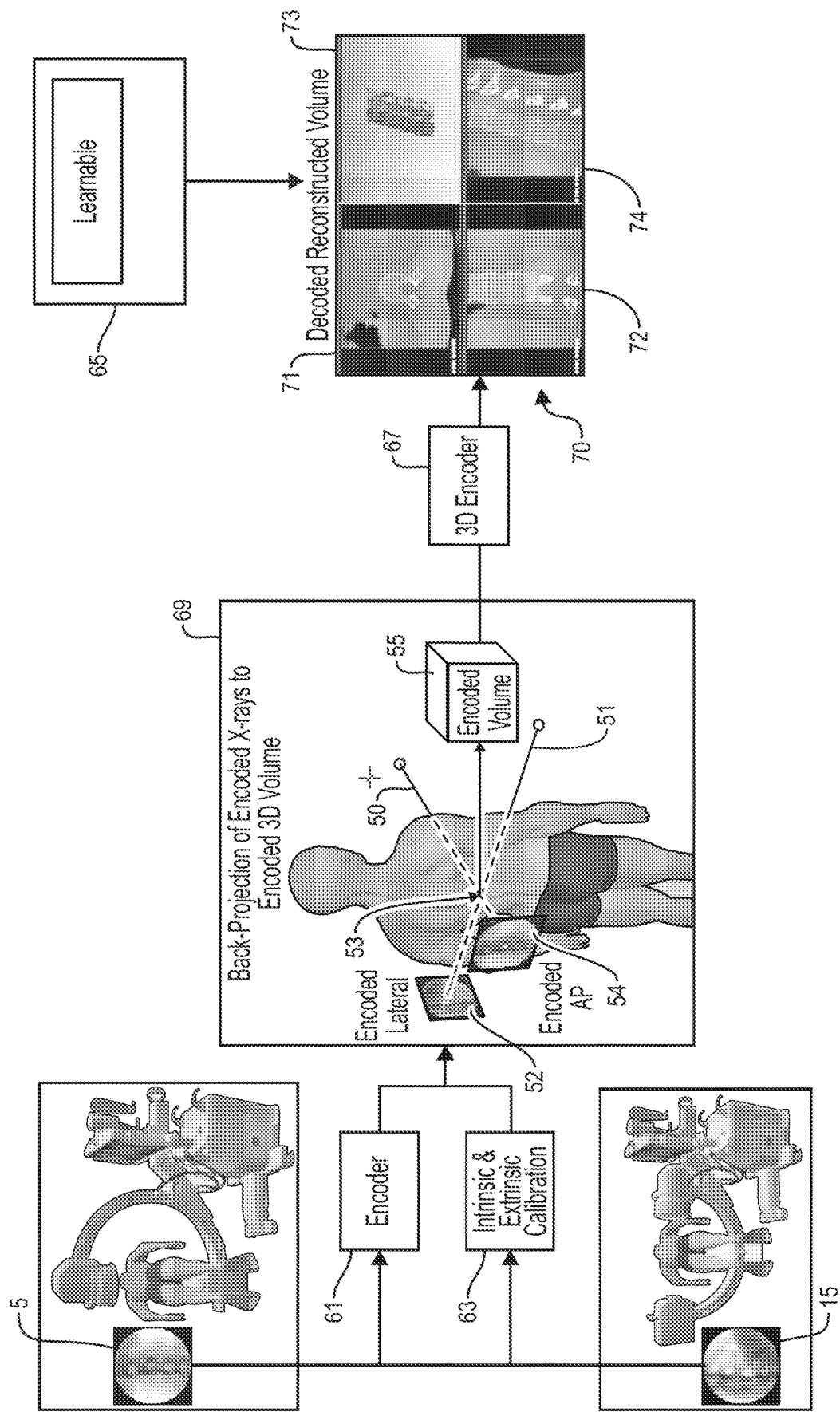
FIG. 14 is a conceptual flow diagram of the processes performed for reconstruction of 3D volumes from biplanar X-ray projections in accordance with an illustrative embodiment.
Figure 15:
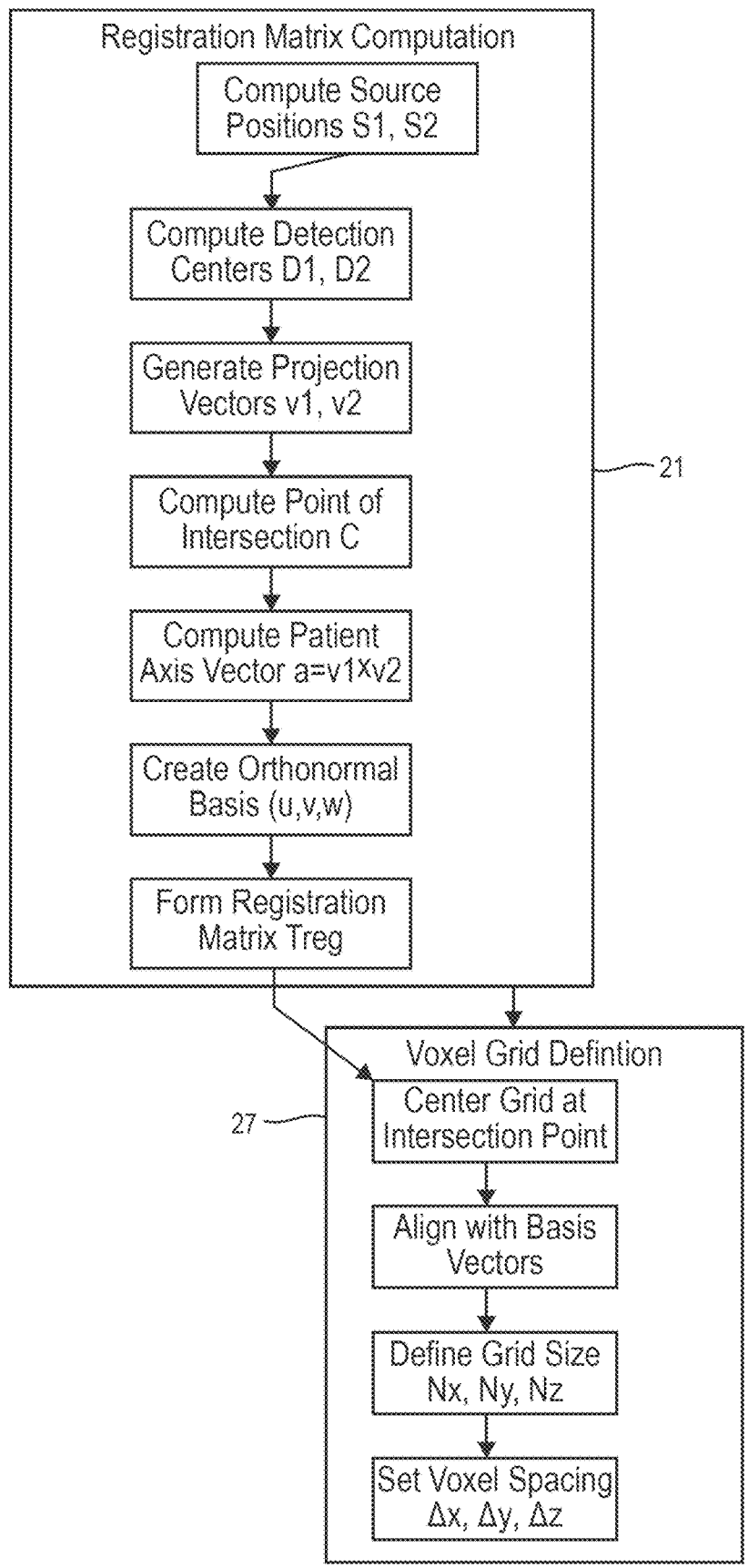
FIG. 15 is conceptual sub-flow diagram of the registration matrix transform calculation and the voxel grid definition processes of FIG. 2A in accordance with one illustrative embodiment.

FIGS. 14-16 illustrate a process for automated reconstruction of a 3D CT volume from 2D X-ray images and display of real-time position and movement of surgical instruments and patient according to the present disclosure. The various acts of process flows may be performed by execution of the computer program instructions 228 stored in the memory 224 and/or storage 227 and controlled by the processor 120 of computer 116, as illustrated in FIG. 14.

Figure 11:
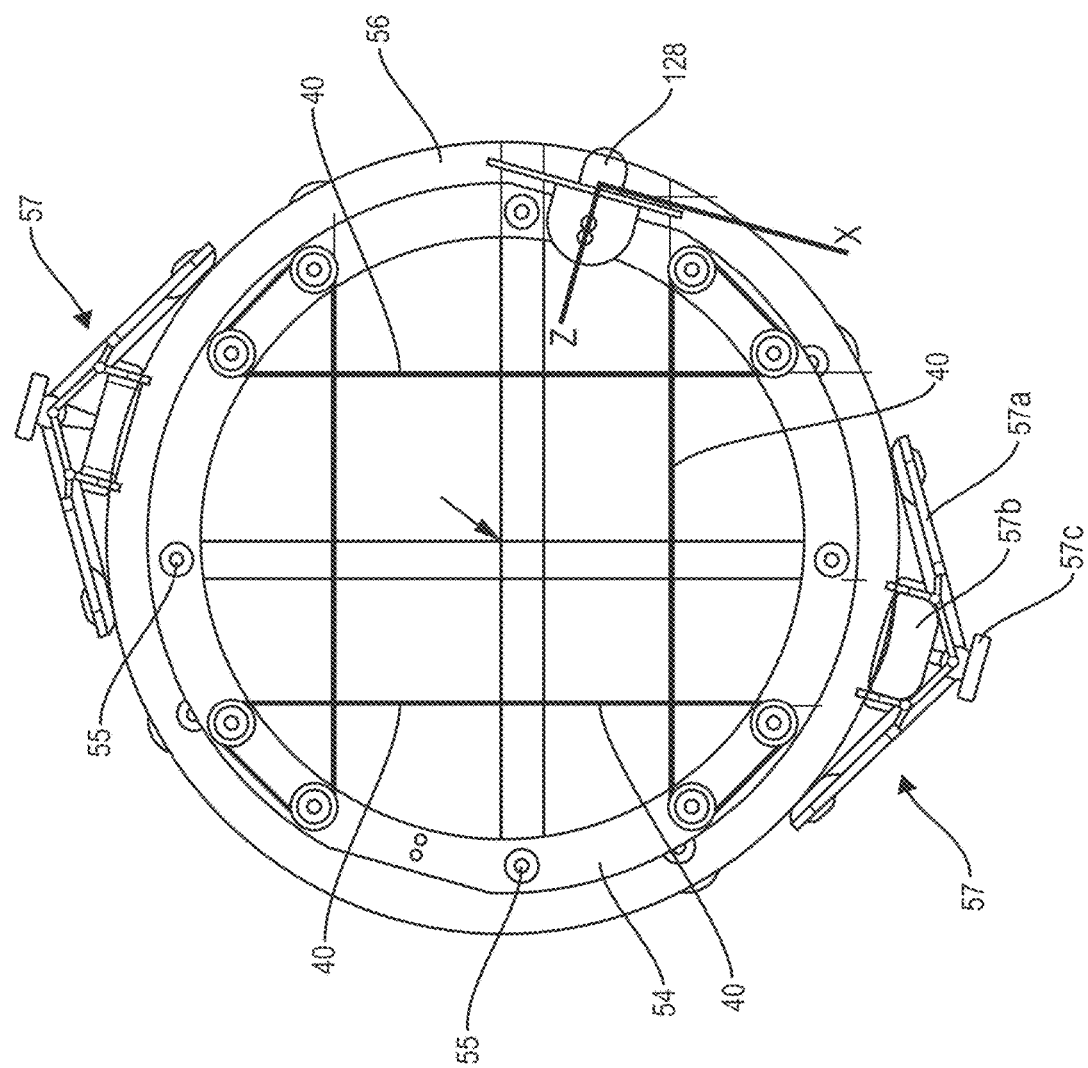
FIG. 11 is a top view illustration of the calibration target apparatus of FIG. 10 in accordance with an illustrative embodiment.

Once the X-ray images are captured, computer executable instructions perform reconstruction of a 3D CT volume 70. The calibrated poses ($R_t$, $t_i$) and intrinsic transform K are used to model X-ray projections using a generalized Radon transform, as further described in co-pending U.S. patent application Ser. No. 18/974,545, entitled "System and Method for Reconstruction of 3D Volumes from Biplanar X-ray Images", filed on an even date herewith. As illustrated in FIG. 140, a pair of radiographic images 5 and 15 are encoded as illustrated by encoder process block 61 and calibrated for intrinsic and extrinsic distortions, as illustrated by calibration process block 63. From the resulting pair of encoded radiographic images of 52 and 54, image projections are used to form basis vector 50 and 51, and their intersection at a central point 53 used for generating the registration transform, as illustrated by process block 69. The encoded radiographic images of 52 and 54 are back projected into a encoded volume 55 which is then decoded, as illustrated by process block 67, into a three-dimensional volume 70 capable of multiplanar views, including axial, sagittal, coronal, and 3D views of the three-dimensional volume. Back-projection and deep learning techniques may be used to reconstruct the 3D volume of CT quality images from the biplanar X-ray images 5 and 15. The three-dimensional volume 70 may be generated with the assistance of deep learning module 65, as illustrated. FIG. 11 illustrates conceptually the relationship between computed central rays of the biplanar images and the voxel grid 45 relative to a portion of patient anatomy 49.

FIG. 16 is a further conceptual sub-flow diagram of the surgical navigation phase 16 of FIGS. 2A-B in accordance with the disclosure. In particular, the process acts for process blocks 31 and 33 are illustrated in greater detail in FIG. 16 with the described acts illustrated in process blocks 81, 83 and 85 thereof. Specifically, given the input sources of a reconstructed 3D volume, the computed registration matrix and output of the optical tracking cameras process, block 81 represents the steps necessary for real-time instrument tracking for both instruments with marker arrays and without markers. Specifically, process block 81 encompasses the acts of detecting any reference markers on the instruments, and, if markers are detected, determining the six degrees of freedom pose of the instrument. If no markers are detected, object recognition software and 3D localization algorithms are utilized to recognize the instrument pose. The output of either of these instrument positions is transformed into the world coordinate system. Process block 83 illustrates the a subprocesses for coordinate transformation, including computing an inverse of the registration transform, transforming the instrument position to volume coordinates and validating that the transformed instrument coordinates are within the bounds of the 3D volume. Such transformations use the same registration transform as used for the 3D volume reconstruction.

Next, the multi-planar reconstruction is utilized to provide real-time display as illustrated by process block 85. In particular, 3D volume renderings from the reconstructed CT volume and the instrument overlay generated in process block 83 are combined to provide multiples views of the patient anatomy including axle, sagittal, coronal, and 3D views updated in real time as illustrated.

Figure 17:
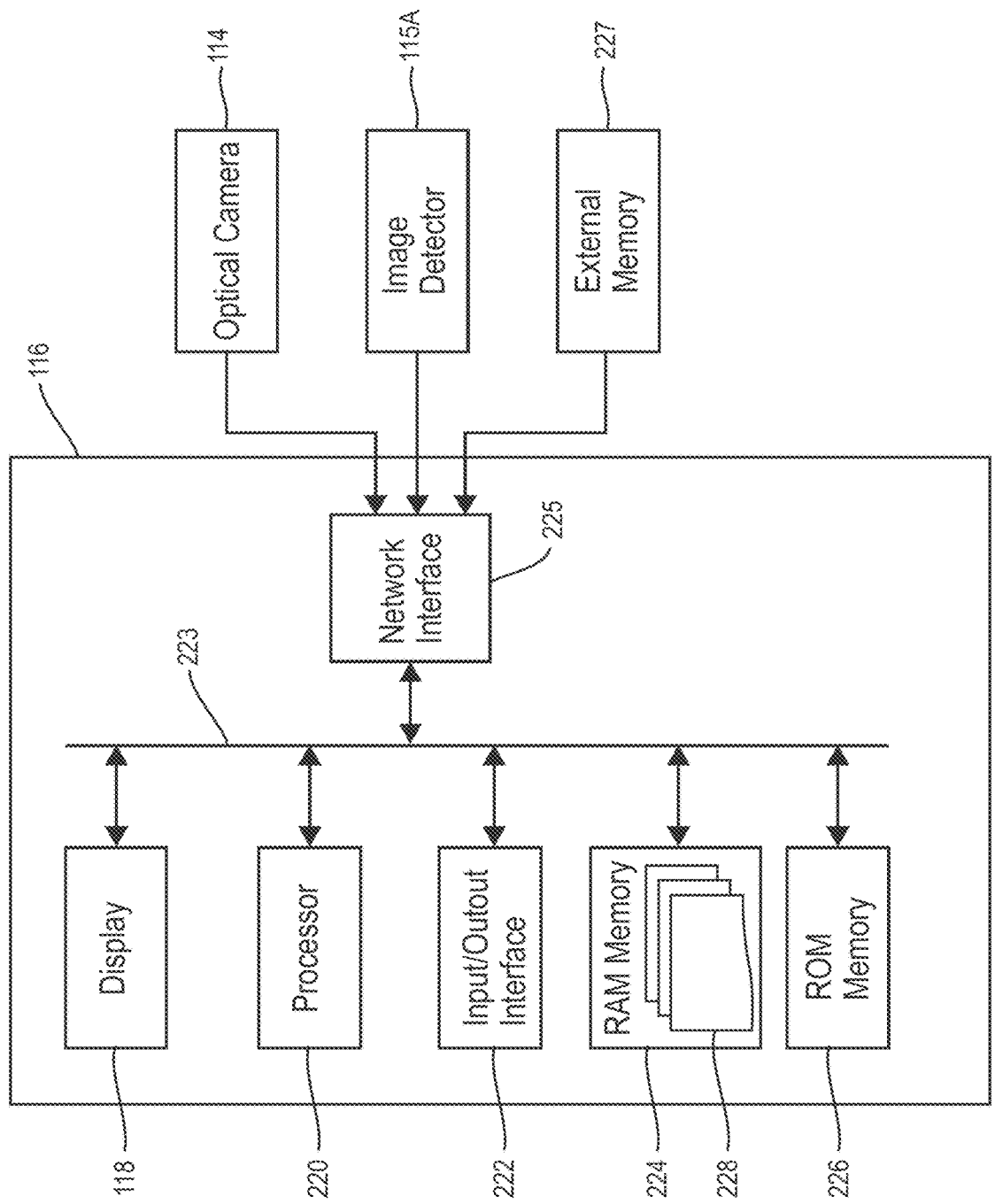
FIG. 17 is a conceptual illustration of a computer system suitable for use with an illustrative embodiment.

The methods described herein may be implemented on a computer 116 using well-known computer processors, memory units, storage devices, computer software, and other components. A high-level block diagram of such a computer is illustrated in FIG. 17. In embodiments, computer 116 comprises display 118, processor 220, I/O interface 222, memories 224 and 226, and network interface 225, all operatively interconnected by bus 223. Network interface 225 operatively connects cameras 114, radiographic image detector 115A, and external memory 227 to the other components of computer 116, as illustrated in FIG. 17. Processor 220 controls the overall operation of the computer 116 by executing software modules or applications comprising computer program instructions 288 which define such operation functionality. The computer program instructions 228 may be stored directly in memory 224 or in an external storage device 227 (e.g., magnetic disk) and loaded into memory 224 when execution of the computer program instructions is desired. Thus, the processes described herein may be defined by the computer program instructions stored in the memory 224 and/or storage 227 and controlled by the processor 220 executing the computer program instructions. ROM memory 226 typically contains computer program instructions comprising the operating system and basic input/output system firmware to provide runtime services for the operating and programs and to perform hardware initialization during power on startup processes.

A radiographic image detector 115A, such as a CT scanner, C-arm CT scanner, or X-ray scanner, or other radiographic image detector, can be connected to the computer 116 via network interface 225 to input image data to the computer 116. It is possible to implement the radiographic image detector 115A and the computer 116 as one device. It is also possible that radiographic image detector 115A and the computer 116 communicate wirelessly through a network infrastructure. In embodiments, the computer 116 can be located remotely with respect to the radiographic image detector 115A and the process described herein can be performed as part of a server or cloud based service. In this case, the process may be performed on a single computer or distributed between multiple networked computers. The computer 116 also includes one or more network interfaces 125 for communicating with other devices via a network. The computer 116 also includes other input/output devices 222 that enable user interaction with the computer 116 (e.g., display, keyboard, mouse, speakers, joystick controllers, etc.). One skilled in the art will recognize that an implementation of an actual computer could contain other components as well, and that FIG. 15 is a high level representation of some of the components of such a computer for illustrative purposes.

Although the systems and methods disclosed herein have been described with reference to patient anatomy and surgical navigation procedures, their applicability is not limited to the same. Any of the systems and methods disclosed herein may be utilized in other situations, including industrial control, package or baggage handling, or any other environments in which the near real-time position and tracking of objects within a volume is required.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

At various places in the present specification, values are disclosed in groups or in ranges. It is specifically intended that the description includes each and every individual sub-combination of the members of such groups and ranges and any combination of the various endpoints of such groups or ranges. For example, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

For purposes of clarity and a concise description, features are described herein as part of the same or separate embodiments, however, it will be appreciated that scope of the concepts may include embodiments having combinations of all or some of the features described herein. Further, terms such as "first," "second," "top," "bottom," "front," "rear," "side," and other are used for reference purposes only and are not meany to be limiting.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to an example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A calibration target apparatus for use with a radiographic image detector of an imaging system, the calibration target comprising:
   a target frame securable to a radiographic image, the target frame defining an interior passage; and
   a plurality of at least partially radiopaque markers coupled to the target frame and transversing the interior passage,
   wherein the plurality of radiopaque markers partially obstruct passage of radiation through the internal passage of the frame.

2. The apparatus of claim 1, wherein the plurality of radiopaque markers are linear in shape.

3. The apparatus of claim 1, wherein the interior passage has a generally circular shape.

4. The apparatus of claim 1, wherein the plurality of radiopaque markers have known spatial coordinates relative to the target frame.

5. The apparatus of claim 1, wherein the target frame comprises a pair of frames secured together by posts.

6. The apparatus of claim 1, wherein the target frame further comprises a pair of brackets for securing the target frame to the radiographic image detector.

7. The apparatus of claim 1, wherein a first of the plurality of radiopaque markers are attached to the target frame at a first depth of the interior passage and a second of the plurality of radiopaque markers are attached to the target frame at a second depth of the interior passage.

8. The apparatus of claim 1, further comprising:
   a side wall encompassing the target frame.

9. The apparatus of claim 2, wherein the plurality of radiopaque markers comprise wires.

10. The apparatus of claim 8, further comprising:
    a reference marker having a unique shape disposed on the sidewall.

11. The apparatus of claim 8, wherein the target frame has a size and shape to enable frictional attachment over the radiographic image detector.

12. The apparatus of claim 10, further comprising:
    plurality of reference markers, each having a unique shape, disposed on the sidewall.

13. The reference apparatus of claim 12, wherein the respective shapes of the plurality of reference markers collectively comprise an asymmetric pattern.

14. A calibration target for use with a radiographic image detector comprising:
    a target body securable to the radiographic image detector, the target body defining an interior passage; and
    a plurality of at least partially radiopaque linear markers fixed to the target body and transversing the interior passage,
    wherein the plurality of at least partially radiopaque linear markers obstruct passage of radiation through the internal passage of the target body.

15. The calibration target of claim 14, wherein the plurality of at least partially radiographic linear markers have known spatial coordinates relative to the target body.

16. The calibration target of claim 14, wherein the plurality of radiopaque markers comprise wires.

17. The calibration target of claim 14, wherein the target body is defined by a side wall.

18. The calibration target of claim 14, wherein the target body has a substantially circular or rectangular exterior perimeter.

19. The calibration target of claim 14, wherein the target body has an end surface comprising a material that is substantially transparent to radiation incident thereon.

20. The calibration target of claim 17, further comprising:
    a reference marker disposed on the sidewall.

21. The calibration target of claim 20, further comprising:
    plurality of reference markers disposed on the sidewall.

22. The calibration target of claim 21, wherein the plurality of reference markers collectively comprise an asymmetric pattern.

23. A calibration target for use with a radiographic image detector comprising:
    a target body securable to the radiographic image detector, the target body defining an interior passage; and
    a plurality of at least partially radiopaque non-spherical markers fixed to the target body and transversing the interior passage,
    wherein the plurality of at least partially radiopaque non-spherical markers obstruct passage of radiation through the internal passage of the target body.

24. The apparatus of claim 23, wherein the plurality of non-spherical markers have known spatial coordinates relative to the target body.

25. The apparatus of claim 24, wherein the plurality of non-spherical markers comprise wires.

* * * * *